US009759160B2

(12) United States Patent
Sankrithi et al.

(10) Patent No.: US 9,759,160 B2
(45) Date of Patent: Sep. 12, 2017

(54) ULTRA-EFFICIENT PROPULSOR WITH AN AUGMENTOR FAN CIRCUMSCRIBING A TURBOFAN

(71) Applicant: The Boeing Company, Chicago, IL (US)

(72) Inventors: Mithra M. K. V. Sankrithi, Lake Forest Park, WA (US); Gerhard E. Seidel, Renton, WA (US); Alan K. Prichard, Lynnwood, WA (US); Matthew Moore, Everett, WA (US)

(73) Assignee: The Boeing Company, Chicago, IL (US)

( * ) Notice: Subject to any disclaimer, the term of this patent is extended or adjusted under 35 U.S.C. 154(b) by 646 days.

(21) Appl. No.: 14/181,684

(22) Filed: Feb. 16, 2014

(65) Prior Publication Data

US 2014/0223884 A1 Aug. 14, 2014

Related U.S. Application Data

(62) Division of application No. 12/555,812, filed on Sep. 9, 2009, now Pat. No. 8,689,538.

(51) Int. Cl.
*B64D 27/12* (2006.01)
*B64D 27/14* (2006.01)
(Continued)

(52) U.S. Cl.
CPC ............. *F02K 3/077* (2013.01); *B64C 11/48* (2013.01); *B64D 27/12* (2013.01); *B64D 27/14* (2013.01);
(Continued)

(58) Field of Classification Search
CPC ... F02K 3/077; F02K 3/06; F01D 7/00; B64C 11/48; B64D 2027/005; B64D 27/14;
(Continued)

(56) References Cited

U.S. PATENT DOCUMENTS 3,768,933 A  10/1973  Boullier
3,792,584 A *  2/1974  Klees ..................... F02K 3/025
415/79

(Continued)

FOREIGN PATENT DOCUMENTS

GB   1309721   3/1973
GB   1497477   1/1978
(Continued)

OTHER PUBLICATIONS

Combined search and examination report mailed on Dec. 10, 2010 for UK Application No. GB1013457.5 filed on the U.S. parent application of the subject U.S. pending application.

*Primary Examiner* — Carlos A Rivera
(74) *Attorney, Agent, or Firm* — McDonnell Boehnen Hulbert & Berghoff LLP

(57) ABSTRACT

An ultra-efficient "green" aircraft propulsor utilizing an augmentor fan is disclosed. A balanced design is provided combining a fuel efficient and low-noise high bypass ratio augmentor fan and a low-noise shrouded high bypass ratio turbofan. Three mass flow streams are utilized to reduce propulsor specific fuel consumption and increase performance relative to conventional turbofans. Methods are provided for optimization of fuel efficiency, power, and noise by varying mass flow ratios of the three mass flow streams. Methods are also provided for integration of external propellers into turbofan machinery.

19 Claims, 26 Drawing Sheets

(51) Int. Cl.
*F01D 7/00* (2006.01)
*F02K 3/06* (2006.01)
*F02K 3/077* (2006.01)
*B64C 11/48* (2006.01)
*B64D 27/02* (2006.01)
*B64D 27/00* (2006.01)

(52) U.S. Cl.
CPC .................. *F01D 7/00* (2013.01); *F02K 3/06* (2013.01); *B64D 2027/005* (2013.01); *B64D 2027/026* (2013.01); *F05D 2220/324* (2013.01); *F05D 2220/325* (2013.01); *F05D 2260/96* (2013.01); *Y02T 50/64* (2013.01); *Y02T 50/66* (2013.01); *Y02T 50/673* (2013.01)

(58) Field of Classification Search
CPC ... B64D 27/12; B64D 2027/026; Y02T 50/66; Y02T 50/673; Y02T 50/64; F05D 2260/96; F05D 2220/325; F05D 2220/324
See application file for complete search history.

(56) References Cited

U.S. PATENT DOCUMENTS

| | | | | |
|---|---|---|---|---|
| 3,867,813 | A * | 2/1975 | Leibach | F02K 3/077 415/79 |
| 3,886,737 | A * | 6/1975 | Grieb | F02K 3/077 181/220 |
| 3,994,128 | A | 11/1976 | Griswold, Jr. et al. | |
| 4,010,608 | A * | 3/1977 | Simmons | F02K 3/075 60/226.3 |
| 4,064,692 | A * | 12/1977 | Johnson | F02K 3/075 60/262 |
| 4,080,785 | A * | 3/1978 | Koff | F02K 3/077 415/69 |
| 4,446,696 | A | 5/1984 | Sargisson et al. | |
| 4,569,199 | A | 2/1986 | Klees et al. | |
| 4,738,591 | A | 4/1988 | Butler | |
| 4,767,270 | A | 8/1988 | Seidel | |
| 4,936,748 | A | 6/1990 | Adamson et al. | |
| 5,281,094 | A | 1/1994 | McCarty et al. | |
| 5,375,978 | A | 12/1994 | Evans et al. | |
| 5,466,198 | A | 11/1995 | McKibbin et al. | |
| 5,908,159 | A * | 6/1999 | Rudolph | F02K 1/383 239/265.17 |
| 6,568,172 | B2 | 5/2003 | Jannetta et al. | |
| 7,891,163 | B2 | 2/2011 | Richards | |
| 8,028,513 | B2 | 10/2011 | Norris et al. | |
| 2005/0163619 | A1 | 7/2005 | Weisse et al. | |
| 2008/0253881 | A1* | 10/2008 | Richards | F02C 7/052 415/145 |
| 2009/0158703 | A1* | 6/2009 | Petty | F02K 1/386 60/230 |
| 2010/0089030 | A1 | 4/2010 | Carmichael | |
| 2013/0000314 | A1* | 1/2013 | McCaffrey | F01D 13/003 60/773 |
| 2013/0156583 | A1* | 6/2013 | Wood | B64C 11/18 416/198 A |

FOREIGN PATENT DOCUMENTS

GB 2100799 A 1/1983
JP EP0952330 A3 5/2000

* cited by examiner

ULTRA-EFFICIENT PROPULSOR WITH AN AUGMENTOR FAN CIRCUMSCRIBING A TURBOFAN

CROSS-REFERENCE TO RELATED APPLICATION

This application claims priority under U.S.C. 120 to and is a Divisional application of U.S. patent application Ser. No. 12/555,812, filed 9 Sep. 2009, content of which is incorporated herein by reference in its entirety.

FIELD

Embodiments of the present disclosure relate generally to turbine engines, and more particularly relate to augmented turbofan engines.

BACKGROUND

In the art of commercial airplanes, it is highly desirable to design airplane and engine configurations that yield reduced fuel burn per seat-mile, which is a metric of airplane fuel efficiency and carbon dioxide emissions. Carbon trading and Carbon tax regulations comparable to those already enacted in the European Union are also likely to be adopted in other industrialized nations including the United States. These environmental considerations become even more important in economic scenarios in which fuel cost increases. This motivates step-change technologies to reduce fuel consumption per passenger mile.

This need for reduced fuel burn per seat-mile may be in conjunction with anticipated near-term increases in stringency of community noise certification regulations. Current European workplace noise exposure regulations that affect allowable aircraft cabin noise work together with local airport environmental policies to also pose significant challenges to advanced propulsion design. Thus, improvements in community and cabin noise relative to existing airplanes are also desirable.

The emissions-based requirements motivate extremely high bypass ratio engines which can most easily be accomplished with un-shrouded engines. Some un-shrouded engines however might not have an optimized configuration for noise reduction. It is also an objective for commercial airplanes including their propulsors to be perceived in a positive way by the flying public, similar to how "jet airplanes" with turbofan propulsors are perceived in a positive way.

One existing approach to providing improved fuel efficiency or reduced fuel burn is to utilize turbofan engines with higher bypass ratios. However, very high bypass ratio turbofans suffer from large weight and drag penalties associated with their very large fan ducts. Very high bypass ratio turbofans also suffer from difficulties associated with achieving under-wing installations in low wing airplanes and difficulties in achieving simple lightweight thrust reversers.

Another existing approach to providing improved fuel efficiency or reduced fuel burn is to utilize a turboprop, propfan, or other "open rotor" types of propulsor. An open rotor propulsor is effectively a propeller with a six to ten discrete individual blades exposed at their tips, with a gas turbine core engine driving the propeller through a gearbox. Open rotor propulsors provide substantially better fuel burn through a higher effective bypass ratio and elimination of fan duct drag and weight, but may have airplane integration challenges, non-optimal community noise levels, and non-optimal cabin noise and vibration.

Thus, there is a need for improvements in turbine engine technology to provide high fuel efficiency, low emissions, low noise, and overall improved integration.

SUMMARY

An ultra-efficient "green" aircraft propulsor utilizing an augmentor fan is disclosed. A balanced design is provided combining a fuel efficient and low-noise high bypass ratio augmentor fan and a low-noise turbofan. Three mass flow streams are utilized to reduce propulsor specific fuel consumption and increase performance relative to conventional turbofans. Methods are provided for optimization of fuel efficiency, power, and noise by varying mass flow ratios of the three mass flow streams. Mass flow may be varied operationally or continuously to optimize these ratios for take-off, climb, cruise, descent, and the like. The ability to independently, dynamically, and automatically vary the power transferred to the airflow between these three mass flow streams provides an engine with a variable cycle capability. Methods are also provided for integration of external augmentor fans into turbofan machinery.

A first embodiment comprises an ultra-efficient aircraft propulsor. The ultra-efficient aircraft propulsor comprises a turbofan propulsor comprising a core engine and a ducted fan driven by the core engine, the ducted fan comprising ducted fan blades circumferentially contained by a fan cowl. The ultra-efficient aircraft propulsor also comprises an augmentor hub ring substantially surrounding an inner perimeter of the fan cowl. The ultra-efficient aircraft propulsor further comprises an augmentor fan driven by the core engine comprising augmentor fan blades arranged circumferentially around the augmentor hub ring.

A second embodiment comprises a method for operating an ultra-efficient aircraft propulsor. The method comprises providing thrust from a core engine at a first thrust to total power ratio, and providing thrust from a ducted fan at a second thrust to total power ratio. The method further comprises providing thrust from an augmentor fan at a third thrust to total power ratio.

A third embodiment comprises a method for generating thrust for a variable cycle engine with an augmentor fan. The method comprises providing a first mass flow stream from an augmentor fan at a first velocity. The method further comprises providing a second mass flow stream from a ducted turbofan at a second velocity. The second mass flow stream is substantially circumscribed by the first mass flow stream. The method also comprises providing a third mass flow stream from a core engine at a third velocity. The third mass flow stream is substantially circumscribed by the second mass flow stream.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION OF EXEMPLARY EMBODIMENTS

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of practical non-limiting applications, namely, aircraft engines and propulsors. Embodiments of the disclosure, however, are not limited to such aircraft applications, and the techniques described herein may also be utilized in other engine and propulsor applications. For example, embodiments may be applicable to hovercraft or other surface-effect vehicles, airboats, industrial fan applications, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
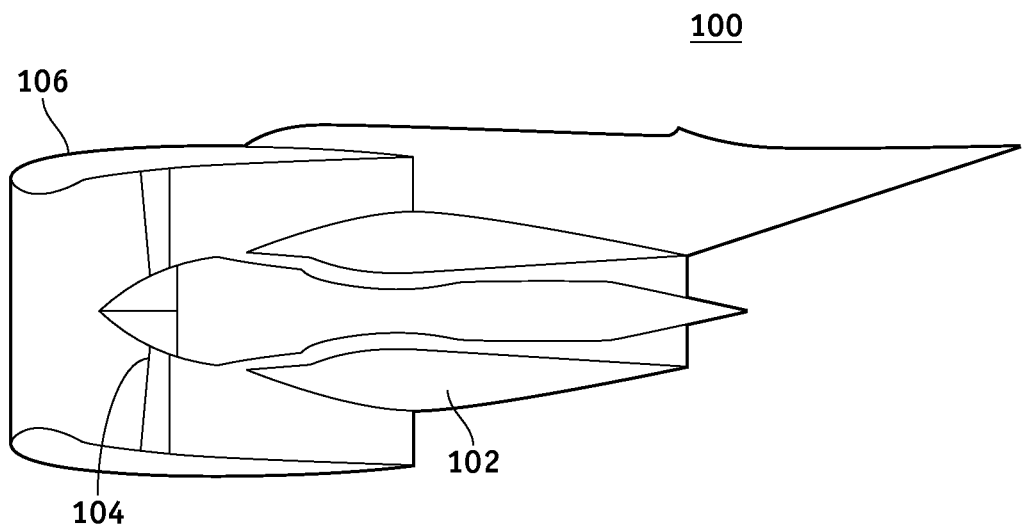
FIG. 1 is an illustration of a schematic cross sectional view of an existing ducted turbofan engine.

FIG. 1 is an illustration of a schematic cross sectional view of an existing ducted turbofan engine 100. The existing ducted turbofan engine 100 may comprise a core engine 102, a ducted fan 104, and a fan cowl 106. A turbofan is a type of aircraft gas turbine engine that provides propulsion using a combination of the ducted fan 104 and jet exhaust from a nozzle of the core engine 102. A first part of an airstream from the ducted fan 104 passes through the core engine 102 at a high speed, providing compressed air and oxygen to burn fuel to create power under the laws of, for example but without limitation, the Brayton thermodynamic cycle. However, a second part of the airstream bypasses the core engine 102 at a slower speed than the jet exhaust from the core engine 102. The slower bypass airstream from the ducted fan 104 produces thrust more efficiently than the high-speed jet exhaust from the core engine 102. The more efficient slow speed airstream from the ducted fan 104 reduces specific fuel consumption compared to a pure jet engine with no ducted fan. This bypass ratio is generally fixed during design and can be optimal during one phase of flight. Usually, the bypass ratio is chosen as a compromise between take-off (static thrust), climb, and cruise.

Turbofans have a net exhaust speed that is much lower than a pure turbojet, but faster than a speed of forward flight. Propulsive efficiency is generally substantially maximized as the mass-average engine exhaust velocity approaches the speed of forward flight; however, due to a presence of drag, engine exhaust velocity will be somewhat higher than the speed of the forward flight. Since turbofans have subsonic exhaust velocity, they are more efficient than pure turbojets at subsonic speeds. Jet engines used in currently manufactured commercial jet aircraft are turbofans due to noise regulations and a need for reduced fuel consumption, whereas early jet transports like the Boeing 707 and Concorde were turbojets. Turbofans are used commercially mainly because they are highly efficient and relatively quiet in operation. Turbofans are also used in many military jet aircraft.

Figure 2:
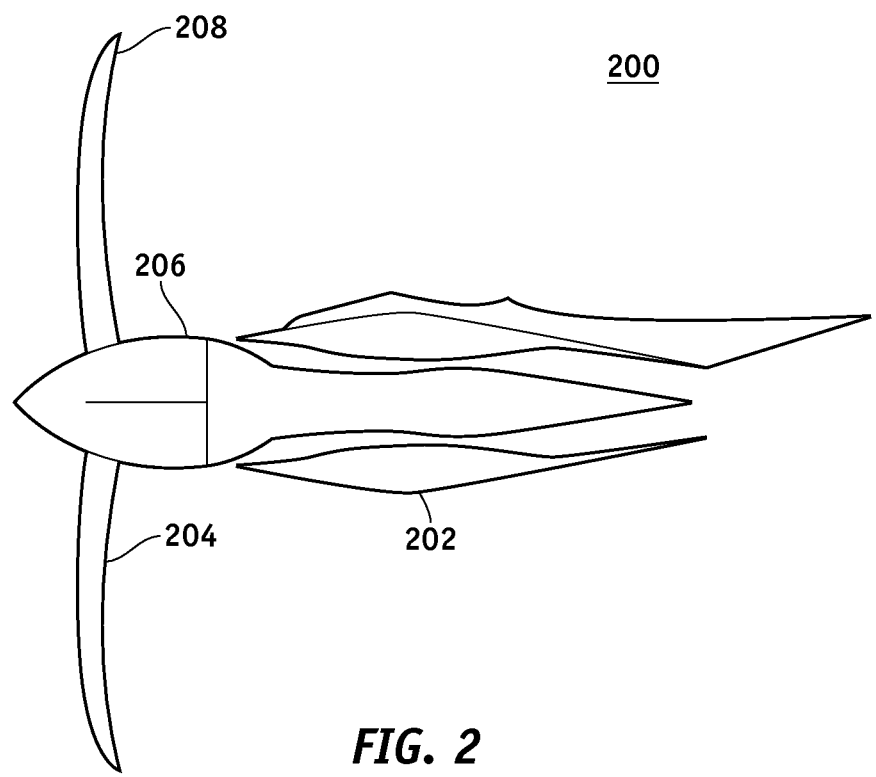
FIG. 2 is an illustration of a schematic cross sectional view of an existing turboprop or single-rotation propfan engine.

FIG. 2 is an illustration of a schematic cross sectional view of an existing turboprop or single-rotation propfan engine 200. The existing turboprop or single-rotation propfan engine 200 (existing propfan engine 200) comprises a core engine 202, an unducted propeller or unducted propfan 204, and a fixed ratio reduction gear 206. The existing turboprop or single-rotation propfan engine 200 is essentially a very high speed propeller driven by the core engine 202. For flight speeds below about Mach 0.6 or 0.7 turboprops have historically been more fuel efficient than either turbojets or turbofans, as they have a higher bypass ratio and achieve most of their thrust with a flow velocity downstream of the propeller that has a smaller incremental velocity than the flow downstream of a ducted fan in a turbofan engine. Propfan versions of the existing turboprop or single-rotation propfan engine 200 are intended to have fuel economy close to that of a turboprop but operate at or close to the speed of the existing turbofan engine 100.

Propfan powered aircraft generally operate at speeds below about Mach 0.8. The Mach 0.8 limit is because existing propellers can lose efficiency at high speed due to limited specific thrust and an effect known as wave drag that occurs near supersonic speeds. Wave drag can have a sudden onset, and for the existing propfan engine 200, wave drag effect can happen any time the unducted propfan 204 is spun fast enough that blade tips 208 of the existing propfan engine 200 travel near the speed of sound. Wave drag can occur even if the aircraft is stationary.

One method of decreasing the wave drag is to sweep the propeller blades of the unducted propfan 204. Sweeping the propeller blades is an effective drag reducing feature; however a challenge with existing propfan designs is that the amount of achievable sweep is structurally limited due to the propeller blades having to be mounted on small spinners. Since the base of the propeller blades of the unducted propfan 204 can move more slowly than the blade tips 208, each propeller blade is progressively more swept toward the blade tips 208, leading to a curved shape similar to a scimitar. Making propeller blades fatter (e.g. more like a "fan") by increasing their chord and/or area moves more air and generates more specific thrust. However, existing propfan designs are usually mounted on the relatively small spinners, so the chord near the root has to be small and the root has to be stout resulting in a less than an optimal aero design.

The existing propfan engine 200 concept was intended to deliver better fuel efficiency than the existing turbofan engine 100. In static and flight tests, versions of the existing propfan engine 200 have reached an about 30% improvement. This efficiency comes at a price, as one of the areas that require improvement of the existing propfan engine 200 is noise, particularly in an era where aircraft are required to comply with increasingly strict noise requirements, such as but without limitation, to "Stage IV" noise requirements (Department of Transportation Federal Aviation Administration 14 Code of Federal Regulations (CFR) Parts 36 and 91 and ICAO Annex 16 Chapter 4 regulations, relevant sections of which are incorporated herein by reference). Furthermore, it is widely recognized in the industry that the framework for yet more stringent regulations will be proposed as part of the ICAO Committee on Aviation Environmental Protection CAEP/8 in year 2010 with discussion between year 2010 and year 2012 with enactment possibly in year 2015. In the 1980s, many existing propfan engines configurations such as the exiting propfan engine 200 were tested. However, projects for the existing propfan engine 200 did not come to fruition, in part because of excessive cabin noise compared to the existing turbofan engine 100, and challenges in meeting existing community noise regulations at the time, (FAR Part 36 Stage 3).

Figure 3A:
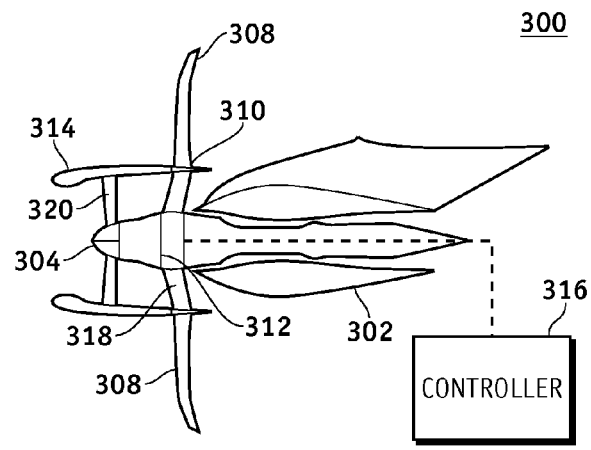
FIG. 3A is an illustration of an exemplary ultra-efficient aircraft propulsor showing a schematic cross sectional view of a shrouded turbofan with an unshrouded augmentor fan according to an embodiment of the disclosure.
Figure 3B:
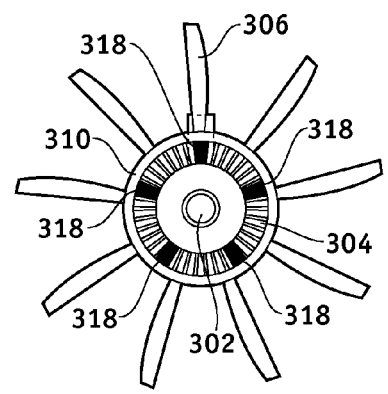
FIG. 3B is an illustration of a rear view of the ultra-efficient aircraft propulsor of FIG. 3A.

FIGS. 3A and 3B are illustrations of a schematic cross sectional view and a rear view of an exemplary ultra-efficient aircraft propulsor (propulsor 300) respectively showing a shrouded turbofan with an unshrouded augmentor fan according to an embodiment of the disclosure. The ultra-efficient aircraft propulsor 300 comprises a core engine 302, a ducted fan 304, an augmentor fan 306, and a power sharing drive system 312. The augmentor fan 306 is added to the ducted fan 304 and the core engine 302 to provide three separate and individually controllable mass flow streams. The ultra-efficient aircraft propulsor 300 may be structurally coupled to a structural element of the aircraft such as a wing, an aircraft body, a strut, and the like.

The core engine 302 is configured to drive the augmentor fan 306. The core engine 302 may be, for example but without limitation, a combustion engine substantially utilizing at least one thermodynamic cycle, such as but without limitation, of a Brayton thermodynamic cycle, an Otto thermodynamic cycle, a Diesel thermodynamic cycle, a Rankine thermodynamic cycle, a Stirling thermodynamic cycle, a Humphrey thermodynamic cycle, a Fickett-Jacobs thermodynamic cycle, a Wave thermodynamic cycle, a Hybrid thermodynamic cycle, a Carnot thermodynamic cycle, and the like. The core engine 302 may comprise an air intake at its forward end and an exhaust at its aft end. The core engine 302 may also comprise at least one compressor comprising at least one of, for example but without limitation, an axial compressor and a centrifugal compressor. The core engine 302 may also comprise at least one combustion chamber, and at least one of: a low pressure turbine, an intermediate pressure turbine, and a high pressure turbine. The core engine 302 may also comprise, for example but without limitation, at least one of a 1-spool, 2-spool, 3-spool, 4-spool core architecture, and the like. Furthermore, the core engine 302 may be equipped with at least one of a generator for utilizing power from the core engine 302 as means for providing electrical power, a bleed port for utilizing power from the core engine 302 as means for providing pneumatic power, and a pump for utilizing power from the core engine 302 as means for providing hydraulic power. In some embodiments, the core engine 302 may comprise an electric motor.

The augmentor fan 306 differs from the unducted propfan 204 of the existing propfan engine 200 in a variety of ways. The augmentor fan 306 comprises an augmentor hub ring 310 and a plurality of augmentor fan blades 308. The augmentor fan blades 308 are arranged circumferentially around the augmentor hub ring 310, and the augmentor hub ring 310 is coupled to a power sharing drive system 312. The augmentor fan 306 may be coupled to the power sharing drive system 312 by, for example but without limitation, fixed or rotating struts 318 (5 rotating struts shown) or other structures. A number of the struts 318 may be the same, more, or fewer than the number of augmentor fan blades 308. The power sharing drive system 312 is coupled to and powered by the core engine 302. The augmentor fan 306 may be controlled by a propulsor controller 316, for example but without limitation, through actuated pitch control of the augmentor fan blades 308. An example of an actuated pitch control mechanism for the actuated pitch control of the augmentor fan blades 308 is explained in more detail in the context of discussion of FIGS. 17-18.

The augmentor fan blades 308 are coupled to the augmentor hub ring 310, and are driven by the core engine 302. The augmentor fan blades 308 may be coupled to the augmentor hub ring 310 with, for example but without limitation, a dual load path attachment (not shown). The augmentor fan blades 308 may comprise airfoil sections. The augmentor fan blades 308 may be rotated about a hub from their root ends to their tip ends by the actuated pitch control mechanism which variably controls blade pitch angles of the augmentor fan blades 308. In this manner, desirable angles of attack of augmentor fan blades 308 can be provided along their span to enable optimization of optimization parameters. The optimization parameters may be defined as a function of, for example but without limitation, a measure of: aerodynamic efficiency, fuel efficiency, community noise, cabin noise, emissions, takeoff performance, climb performance, cruise performance, performance in descending flight, reverse thrust performance, and power division between the augmentor fan 306, the ducted fan 304, and the core engine 302.

Outer surfaces of the augmentor hub ring 310 may be substantially coplanar with adjacent outer surfaces of the fan cowl 314 of the ducted fan 304. The augmentor hub ring 310 may substantially surround an inner perimeter of the fan cowl 314. In an alternative embodiment, the augmentor hub ring 310 may substantially surround an inner perimeter of an exhaust nozzle of the core engine 302. In one embodiment, the augmentor hub ring 310 is substantially located on a circle of larger size and surrounding an inner perimeter of at least one fan cowl 314. Mounting the augmentor fan blades 308 on the augmentor hub ring 310 allows for a significantly larger number of the augmentor fan blades 308 (e.g., inclusive of 16 blades or more) than the existing propfan engine 200 which may be generally limited to about ten blades. In this manner, the ultra-efficient aircraft propulsor 300 creates a blade count which enables reduced loading per blade and thereby serves as means for reducing blade-loading drive noise. Due to the inherently greater hub diameter of the augmentor hub ring 310, the augmentor fan blades 308 can have a greater degree of aerodynamic and acoustic tailoring than the existing art such as, for example but without limitation, mid-span sweep. The acoustic tailoring of the augmentor fan blades 308 is explained in more detail in the context of discussion of FIG. 16 below.

The power sharing drive system 312 is configured to rotationally drive the augmentor fan 306 using power from turbine elements in the core engine 302. The power sharing drive system 312 may also be configured to rotationally drive the augmentor fan 306 using power from the ducted fan 304. The power sharing drive system 312 may drive the augmentor fan 306 at lower revolutions per minute (RPM) than the core engine 302 and/or the ducted fan 304. The power sharing drive system 312 may also drive the ducted fan 304 at lower RPM than turbine elements of the core engine 302. The power sharing drive system 312 may comprise gears for transmitting power while changing RPM. The gears may comprise a driving differential gear from one or more power shafts from the core engine 302. The power sharing drive system 312 may also comprise a driven gear ring or hub gear around an inner periphery of the augmentor hub ring 310, and connecting gear elements between the driving gear ring and the driven gear ring. The driving differential gear allows a relative thrust of the augmentor fan 306, the ducted fan 304, and the core engine 302 to be changed. The power sharing drive system 312 is discussed in more detail below in the context of discussion of FIGS. 19-27 below.

The propulsor controller 316 may be configured to control at least a fraction of the propulsor 300 total mass flow which is run through the augmentor fan 306. The propulsor controller 316 may be further configured for power sharing control as explained in more detail below. The power sharing control allows optimization of minimum fuel burn, minimum operational cost, minimum emissions and/or minimum noise as explained below. The propulsor controller 316 may also control, for example but without limitation, at least one of core engine power, core engine thrust, core engine RPM, core engine fuel flow, core engine critical temperature parameter, fan thrust, fan RPM, augmentor fan blade pitches, augmentor fan thrust, augmentor fan RPM, and the like.

Figure 4:
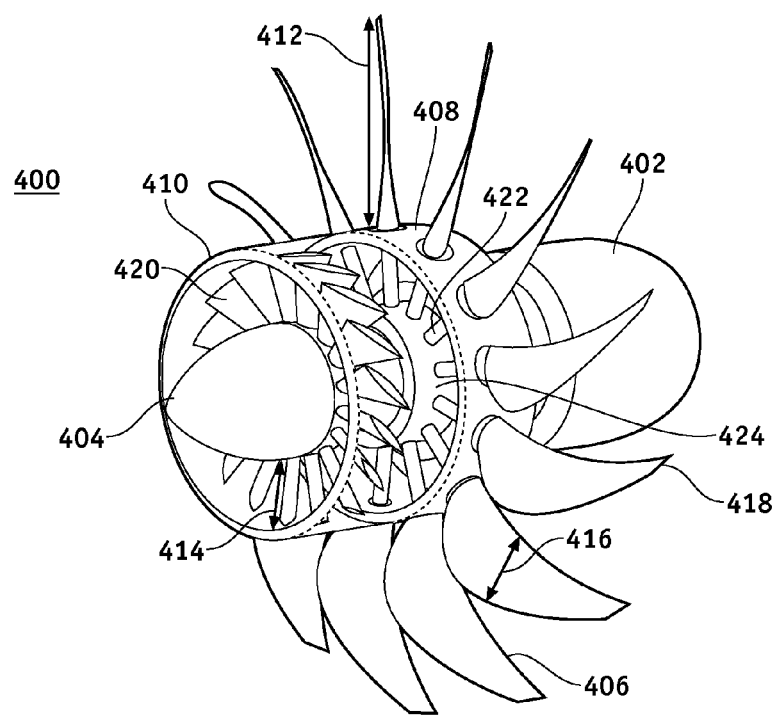
FIG. 4 is an illustration of a 3-dimensional view of the exemplary ultra-efficient aircraft propulsor of FIG. 3.

FIG. 4 is an illustration of an exemplary ultra-efficient aircraft propulsor 400, which is a 3-dimensional rendering of the ultra-efficient aircraft propulsor 300 of FIG. 3. The ultra-efficient aircraft propulsor 400 comprises a core engine 402, a ducted fan 404, an augmentor hub ring 408, a plurality of augmentor fan blades 406, and a plurality of ducted fan blades 420. The augmentor hub ring 408 may be substantially aero dynamically flush with a fan cowl (duct) 410 of the ducted fan 404. A diameter of the ducted fan 404 may be, for example but without limitation, about 6 feet to about 12 feet depending on a required thrust. A number of the augmentor fan blades 406 may be, for example but without limitation, between three and sixty to reduce noise as explained in more detail below. The augmentor fan blade span 412 of augmentor fan blades 406 each may be, for example but without limitation, between about 0.05 and about 5 of a ducted fan blade span 414 of each of the ducted fan blades 420. Each of the augmentor fan blades 406 may have an average chord 416 to augmentor fan blade span 412 ratio of, for example but without limitation, between about 0.02 and about 2. Each of tips 418 of each of the augmentor fan blades 406 may have, for example but without limitation, nonzero taper, nonzero sweep, morphably controllable surfaces, aerodynamic suction or blowing, and the like. In one embodiment, a preferred activity factor of the augmentor fan blades 406 may be at least 150 and at most 250. Alternatively, a preferred activity factor may be greater than 250. In one embodiment, the tips 418 of the augmentor fan blades 406 may be substantially located on a circle of larger size and surrounding an outer perimeter of all of the ducted fan blades 420 of the ducted fan 404 and an outer perimeter of the fan cowl 410. According to embodiments of the disclosure, the number of the augmentor fan blades 406 and a number of the ducted fan blades 420 can be chosen to avoid sum and difference tones. For example, a ratio of augmentor fan blades 406 to the ducted fan blades 420 may be, for example but without limitation, 16/13, 16/7, 13/18, and the like.

The ultra-efficient aircraft propulsor 400 may also comprise bearing means 3972 (FIG. 39) operable to enable a rotating structural connection, wherein the augmentor hub ring 408 is structurally coupled by the bearing means 3972 to the fan cowl 410. The bearing means 3972 may comprise a variety of bearing types. The ultra-efficient aircraft propulsor 400 may also comprise a strut 422 and a mechanical drive connection 424 to the core engine 402.

The ultra-efficient aircraft propulsor 400 comprises a single-rotation augmentor fan blades 406 located aft of the ducted fan 404. Various embodiments may have the augmentor fan blades 406 turning in the opposite or same direction as the ducted fan 404, and may have same-handed or opposite-handed propulsors installed on the port and starboard sides of an aircraft respectively (e.g., installed on port and starboard wings). Designs may be optimized to minimize swirl losses behind a propulsor, and designs may use opposite-handed propulsors to minimize aircraft net drag and to significantly reduce or eliminate any necessity to have airframe left and right handed differences to address aerodynamic asymmetries, for example, due to propulsor swirl effects.

Figure 5:
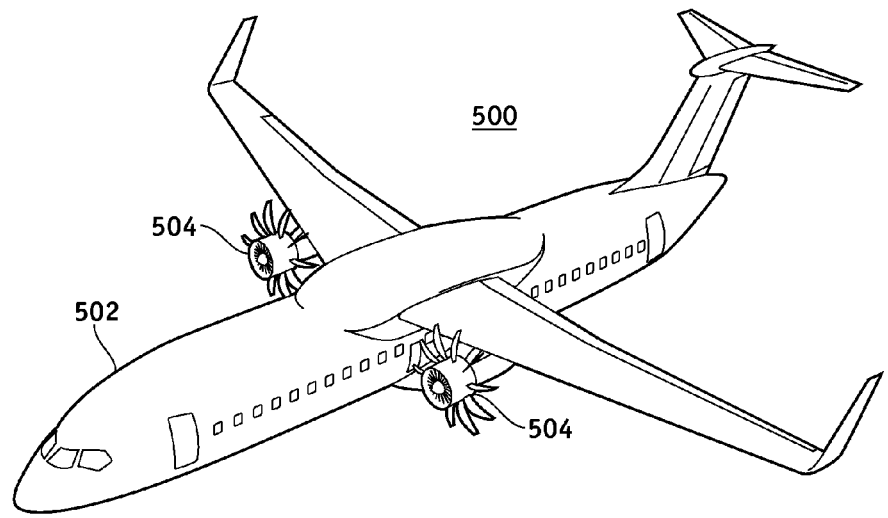
FIG. 5 is an illustration of two exemplary ultra-efficient aircraft propulsors mounted on respective wings of a high wing aircraft according to an embodiment of the disclosure.

FIG. 5 is an illustration of two exemplary ultra-efficient aircraft propulsors mounted on respective wings of a high wing aircraft 500 according to an embodiment of the disclosure. The high wing aircraft 500 comprises, for example but without limitation, two ultra-efficient aircraft propulsor engines 504. A high wing mounting embodiment shown in FIG. 5 is one example and other mountings, such as but without limitation, low wing mountings, body mountings, strut mountings, tail mountings, a combination thereof, and the like may also be used. Each of the ultra-efficient aircraft propulsor engines 504 may comprises, for example but without limitation, 16 augmentor fan blades (e.g., augmentor fan blades 406 in FIG. 4).

When conventional aircraft operate on flight patterns over populated areas, noise requirements often require a pilot to throttle the engine back. This may not be optimal for certain aircraft operations since a throttled-back engine can be slower to reach full power, when faster time to reach full power may be desired for certain flight conditions. This is particularly so during takeoff, when shortly after rotation during takeoff, the pilot may have to reduce thrust to reduce noise over populated areas or noise sensitive locations such as hospitals or schools which can reduce ride comfort, and increase a length of time and distance it takes for the aircraft to reach its final efficient cruising altitude. In contrast, the ultra-efficient aircraft propulsor engines 504 can function differently by instead changing configuration/thrust ratio over the populated areas to reduce noise while maintaining power, thereby maintaining or increasing safety margins and performance. Such an engine that operates in various modes can be called a variable cycle engine.

Figure 6:
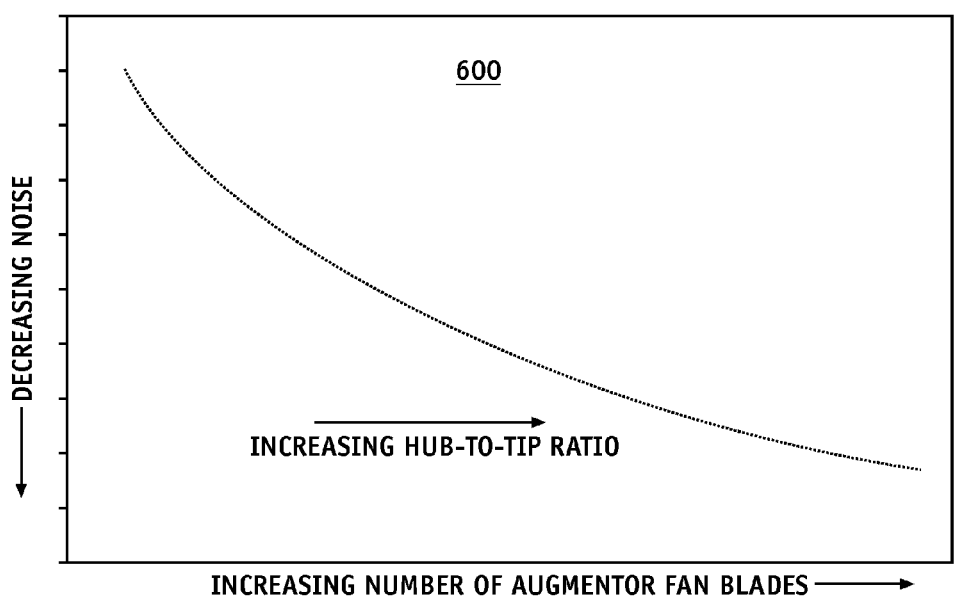
FIG. 6 is a graph illustrating a relationship between a number of augmentor fan blades, and noise as a function of hub-to-tip ratio for an exemplary ultra-efficient aircraft propulsor according to an embodiment of the disclosure.

FIG. 6 is a graph 600 showing a relationship between a number of augmentor fan blades and noise as a function of hub-to-tip ratio for an exemplary ultra-efficient aircraft propulsor according to an embodiment of the disclosure. As shown in FIG. 6, noise decreases as the number of augmentor fan blades increases.

Existing propeller design practice is generally limited to up to about six to ten blades because of challenges with, for example but without limitation, integration of the propeller pitch control unit (PCU), blade support bearings, blade root size limitations, and the like. Blade root size for existing propellers is constrained by a small size of a propeller hub relative to a length of a propeller blade (i.e., low hub to tip ratio). For the existing propfan engine 200, a forward speed of an attached aircraft combined with the rotational speed of blades of the unducted propfan 204 may result in undesirable additional wave drag at aircraft speeds over about Mach 0.7. Current art cannot use propeller blades with aggressive tailoring such as an aggressive sweep and lean (good for low noise) due to flutter caused in part by a small base of hubs of the current art.

There are a number of benefits to the large number of blades made possible with the augmentor fan according to various embodiments of the disclosure. For example, wave drag can be reduced by using the larger number of the augmentor fan blades 406 allowing production of more power at a lower rotational speed. Also, a noise frequency may be changed to a more desirable frequency.

A blade pass frequency (BPF) of a fan refers to a frequency at which blades pass a fixed eternal location. The BPF also indicates a frequency of noise caused by the blades, since blade noise generally corresponds in frequency with the BPF. The fan BPF noise level intensity can vary with the number of blades and the rotation speed. The fan BPF noise level can be expressed as $$BPF = \frac{n * t}{60},$$

where BPF is Blade Pass Frequency in Hz, n is rotation velocity in rpm, t is number of the blades, and 60 is time in seconds.

For example, if a fan with 10 blades rotates with 2400 rpm, the BPF can be calculated as follow:

$$BPF = \frac{(2400 \; rpm) * (10)}{60 \; \frac{s}{minute}} = 400 \; Hz$$

The BPF of the existing art is generally below 100 Hz, and for the existing propfan engine 200, it may be between about 70 Hz and about 100 Hz. For the existing propfan engine 200, the energy in the sound waves below 100 Hz may be high and audible to the surroundings, especially with fans with few blades. In contrast, a BPF of embodiments of the present disclosure can be between about 300 Hz to about 400 Hz due to higher numbers of blades. Sound waves of 300 Hz to 400 Hz are more readily attenuated by the atmosphere than 100 Hz sound waves. Sound waves of 300 Hz to 400 Hz also possess more desirable structural resonance excitation properties relative to 100 Hz or less sound waves. Sound waves of 300 Hz to 400 Hz enable use of more effective and lighter weight cabin noise attenuation structures and techniques.

In an active control of tonal noise from fans, one factor that can limit an achievable attenuation is fluctuation of the BPF in time. Large fluctuations in a short time can hinder an algorithm from converging to the optimal solution, and can require larger actuation systems that require greater energy. Some fans have less steady speeds than others, which can be due to unsteady driving mechanisms or the physical structure of the fan. Environmental effects, such as back pressure and unsteady blade loading, can also cause speed of the fan to fluctuate. The shifting in the BPF can be measured using a zero-crossing technique to track the frequency of each cycle. The controller 316 may be used to control the frequency of each cycle.

Also as shown in FIG. 6, noise decreases as hub-to-tip ratio increases. A high hub-to-tip ratio enables integration of more propeller blades (e.g., augmentor fan blades 406), which is significantly beneficial for reducing noise. As mentioned above, the number of the augmentor fan blades 406 and a number of the ducted fan blades 420 can be chosen to avoid sum and difference tones. The high hub-to-tip ratio of the present embodiments allows a single hub blade count of up to 14, 16 or more. This in turn allows greater volume for blade retention, blade pitch change, and the like. In addition, the high hub-to-tip ratio enables use of higher activity factor blades with more aggressive tailoring of the propeller blade shape for low noise and improved performance at higher speeds. Furthermore, due to high hub diameter, an overall span (e.g., augmentor fan blade span 412 in FIG. 4) of a propeller blade can be reduced relieving flutter. A high hub-to-tip ratio by itself can cause a second order effect that reduces noise. In an embodiment, an augmentor fan blade hub-to-tip ratio is larger than a corresponding ratio for at least one of a propfan propulsor and a turboprop propulsor. The augmentor fan blade hub-to-tip ratio may be, for example but without limitation, at least about 0.4.

Figure 7:
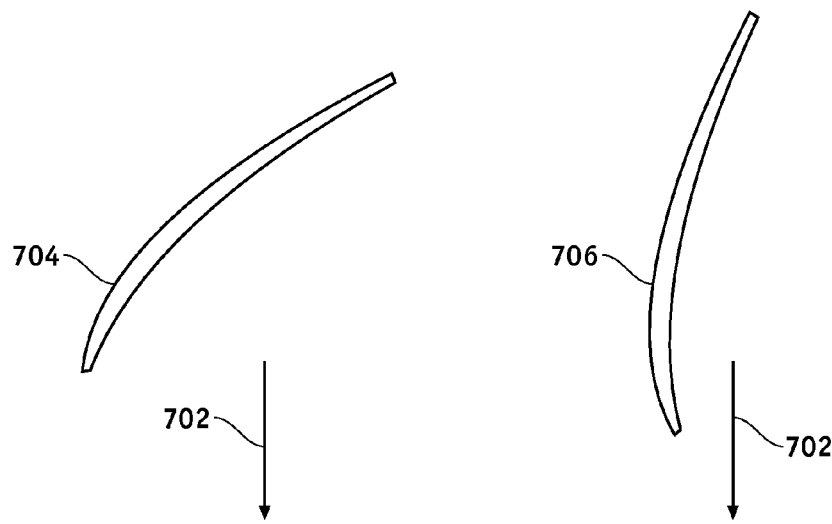
FIG. 7 is an illustration of a high angle of attack propeller blade angle, and a low angle of attack propeller blade angle according to one or more embodiments of the disclosure.

FIG. 7 is an illustration of a high angle of attack propeller blade 704 and a low angle of attack propeller blade 706 according to one or more embodiments of the disclosure. Changing an angle of attack of each of the augmentor fan blades 308 allows the ultra-efficient aircraft propulsor 300 to vary a percentage of thrust coming from the augmentor fan 306. The high angle of attack propeller blade 704 can produce more power, but may also produce more noise. The high angle of attack propeller blade 704 corresponds to a high augmentor fan ratio as a percentage of total engine power. The low angle of attack propeller blade 706 can produce less noise, but may also produce less power. The low angle of attack propeller blade 706 corresponds to a low augmentor fan ratio as a percentage of total engine power.

Figure 8:
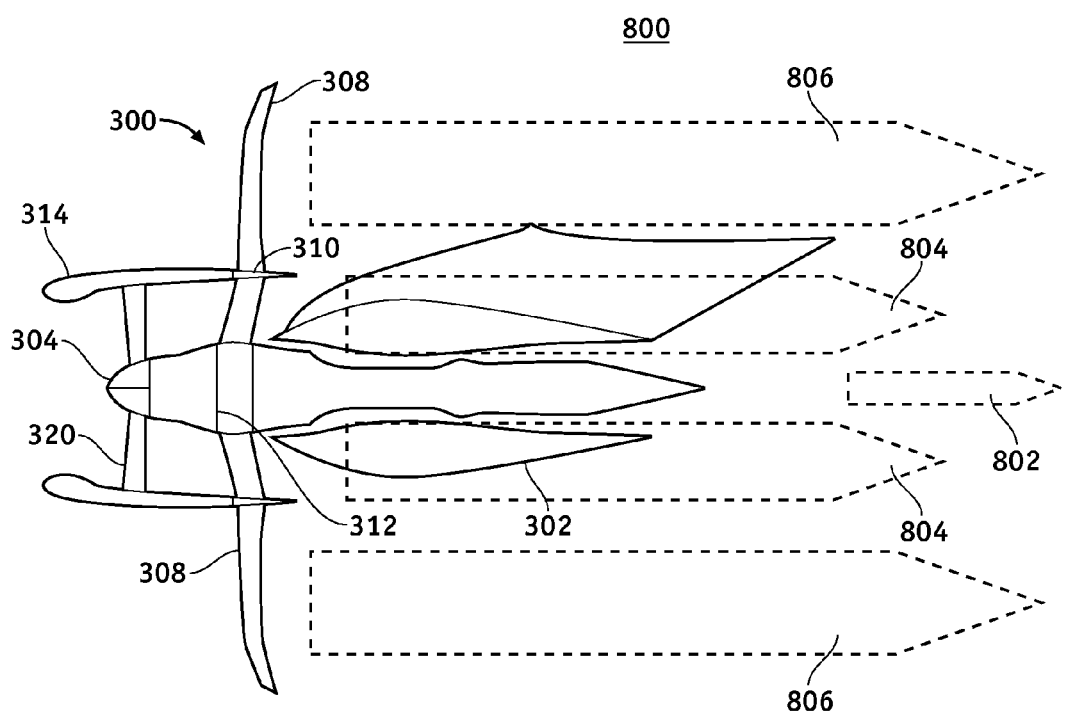
FIG. 8 is an illustration of three mass flow streams of an exemplary ultra-efficient aircraft propulsor according to an embodiment of the disclosure.

FIG. 8 is an illustration of three mass flow streams 800 of the exemplary ultra-efficient aircraft propulsor 300 according to an embodiment of the disclosure. The three mass flow streams 800 comprise a core mass flow stream 802, a ducted fan mass flow stream 804, and an augmentor fan mass flow stream 806.

The core engine 302 (FIG. 3) produces the core mass flow stream 802 with a relative high velocity ($V_c$). For example but without limitation, about 10% to about 20% of the thrust from the ultra-efficient aircraft propulsor 300 may come from the core mass flow stream 802. Control of the core mass flow stream 802 is provided by throttling the core engine 302. The core mass flow stream 802 may be substantially circumscribed by the ducted fan mass flow stream 804.

The ducted fan 304 produces the ducted fan mass flow stream 804 with a relative medium velocity ($V_d$). For example but without limitation, about 10% to about 50% of the thrust from the ultra-efficient aircraft propulsor 300 may come from the ducted fan mass flow stream 804. A difference between $V_d$ and the $V_c$ can reduce at least one of turbulence and noise generation between the ducted fan mass flow stream 804 and the core mass flow stream 802. Control of the ducted fan mass flow stream 804 is provided by throttling the core engine 302, or by a power splitting mechanism such as power sharing drive system 312, which splits power between the ducted fan 304 and the augmentor fan 306. The ducted fan mass flow stream 804 may be substantially circumscribed by the augmentor fan mass flow stream 806.

The augmentor fan 306 produces the augmentor fan mass flow stream 806 with a relative medium velocity ($V_{af}$), which may be lower than the velocity ($V_d$) of the ducted fan mass flow stream 804. For example but without limitation, about 30% to about 80% of the thrust from the ultra-efficient aircraft propulsor 300 may come from the augmentor fan mass flow stream 806. A difference between the $V_{af}$ and the $V_d$ can reduce at least one of turbulence and noise generation between the augmentor fan mass flow stream 806 and the ducted fan mass flow stream 804. Control of the augmentor fan mass flow stream 806 is provided by a power splitting mechanism such as the power sharing drive system 312, which splits power between the ducted fan 304 and the augmentor fan 306, or by changing a pitch angle of the augmentor fan blades 308 of the augmentor fan 306.

The three mass flow streams 800 of the ultra-efficient aircraft propulsor 300 may be suitably controlled to vary power and noise output based on, for example but without limitation, various fight conditions, operation requirements and parameters, and the like, which can be programmed into flight control computer logic so that operation is transparent to a human pilot.

Figure 9:
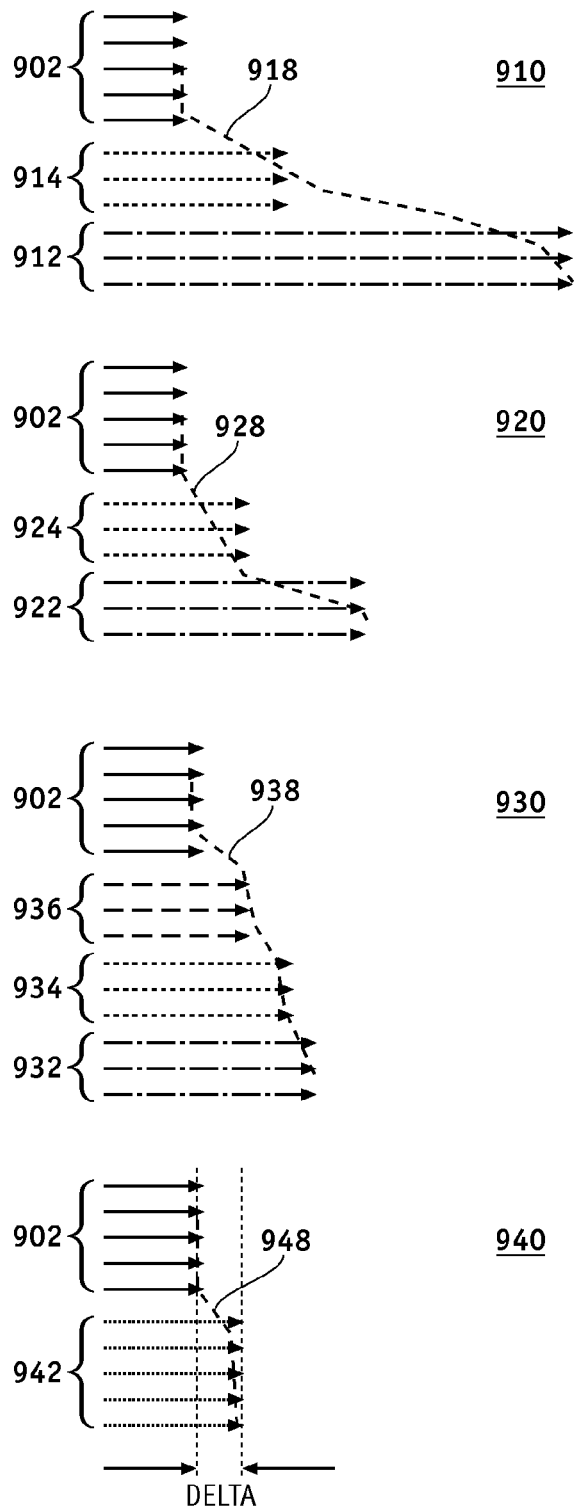
FIG. 9 is an illustration of velocity profiles for a current art ducted turbofan, a current art propfan, an exemplary ultra-efficient aircraft propulsor with an augmentor fan according to an embodiment of the disclosure, and an "ideal" profile.

FIG. 9 is an illustration of velocity profiles for a current art ducted turbofan 910, a current art propfan 920, an exemplary embodiment of an ultra-efficient aircraft propulsor with an augmentor fan 930 of the present disclosure, and an ideal profile 940. In flight, aircraft engines produce thrust in equivalence to aircraft drag to maintain a steady air speed. An efficiency difference between engine technologies is in how much energy is "wasted" producing jet velocity in excess of what is required to move a given quantity (mass flow) of air to the speed which produces thrust equal to drag. Thrust from an aircraft is most efficient when the difference between the thrust for engine and the free stream air surrounding the aircraft is a minimum. Thus for highest efficiency, a Delta between an ideal efficiency stream 942 to a free stream 902 (e.g., ambient air) is substantially at a minimum. The Delta may be represented by a mean velocity profile 948 (e.g., 948 for the "ideal" profile 940). Due to having discrete annular airstreams, there can be some degree of a step or bell-curve like profile as opposed to an "ideal" mean velocity profile 948.

For the current art ducted turbofan 910, the high velocity of the core engine stream 912 has a large velocity difference relative to a fan stream 914 as represented by the velocity profile 918. In turn, the fan stream 914 has a large velocity difference relative to the free stream 902 as represented by the velocity profile 918.

For the current art propfan 920, the velocity of the propeller stream 924 has a relatively moderate velocity difference relative to the free stream 902 as represented by the mean velocity profile 928. However, the core engine stream 922 has a large velocity difference relative to the propeller stream 924 as represented by the mean velocity profile 928.

For the ultra-efficient aircraft propulsor with an augmentor fan 930 use of three streams rather than two moves the mean velocity profile 938 closer to the "ideal" mean velocity profile 948. The velocity of the augmentor fan stream 936 has a relatively small velocity difference relative to the free stream 902 as represented by the mean velocity profile 938 due to the relatively low velocity of the augmentor fan stream 936. The fan stream 934 has a relatively small velocity difference relative to the augmentor fan stream 936 as represented by the mean velocity profile 938. Furthermore, the core engine stream 932 has a relatively small velocity difference relative to the fan stream 934 as represented by the mean velocity profile 938 due to removal of substantially most of the power to the augmentor fan stream 936. Furthermore, power sharing according to various embodiments of the disclosure tailors energy in each of the three streams 932/934/936 to substantially maximize efficiency over various flight regimes, such as but without limitation, takeoff, climb, cruise, and the like. In this manner, energy extraction from the core engine stream 932 is substantially maximized.

Figure 10A:
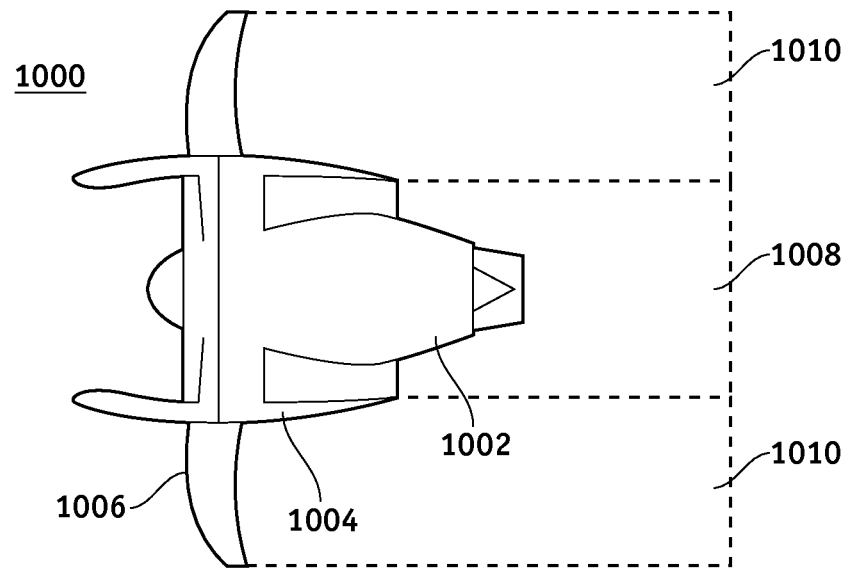
FIG. 10A is an illustration of an exemplary ultra-efficient aircraft propulsor with a high augmentor fan thrust ratio configuration according to an embodiment of the disclosure.
Figure 10B:
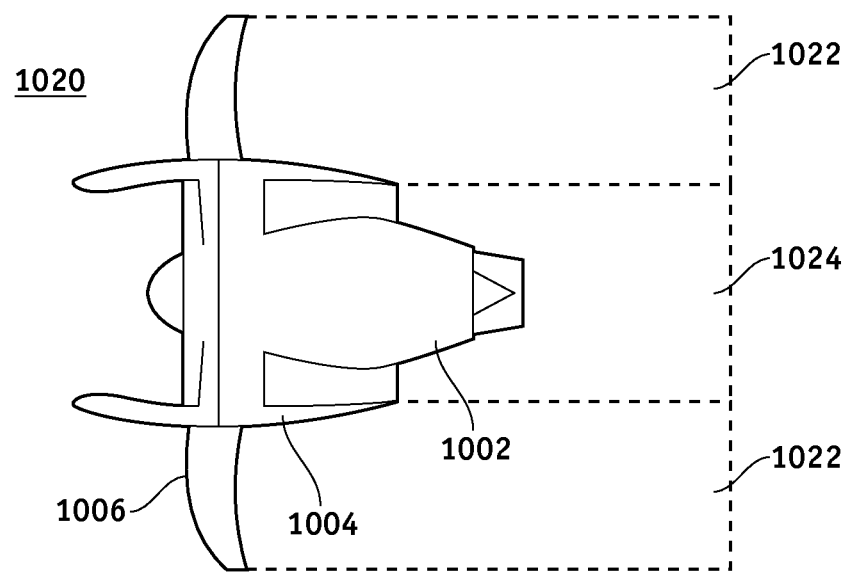
FIG. 10B is an illustration of an exemplary ultra-efficient aircraft propulsor with a low augmentor fan thrust ratio configuration according to an embodiment of the disclosure.

FIGS. 10A and 10B are illustrations of an exemplary ultra-efficient aircraft propulsor 1000 (propulsor 1000) with a high augmentor fan ratio configuration, and an exemplary ultra-efficient aircraft propulsor 1020 (propulsor 1020) with a low augmentor fan ratio respectively, according to two embodiments of the disclosure. FIGS. 10A and 10B show mass flow streams that can be produced by the propulsors 1000 and 1020 at a high and a low augmentor fan ratio (e.g., a ratio of thrust derived from an augmentor fan to total engine thrust). The propulsors 1000 and 1020 each have a structure that is similar to the ultra-efficient aircraft propulsor 300, common features, functions, and elements will not be redundantly described herein. The propulsor 1000 may comprise a core engine 1002 and a ducted fan 1004 producing a combined core and ducted fan flow 1008. The propulsor 1000 also comprises an augmentor fan 1006 producing an augmentor fan flow 1010. At a high ratio, a substantially highest amount of thrust comes from the augmentor fan 1006, and at a low ratio a substantially lower amount of thrust comes from the augmentor fan 1006.

The high augmentor fan ratio configuration of the propulsor 1000 causes the propulsor 1000 to produce the augmentor fan flow 1010 at about 60% to about 80% of total engine thrust, and a combined core and ducted fan flow 1008 at about 20% to about 40% of total engine thrust. The augmentor fan 1006 is configured to produce a substantially maximum power. The power sharing drive system 312 may send most of the power to the augmentor fan 1006, and a pitch angle of the augmentor fan 1006 may be configured for a high angle of attack to substantially maximize the power.

The augmentor fan 1006 has a higher thrust efficiency than the core engine 1002 and the ducted fan 1004. This may be particularly true for higher density air at lower altitudes. For example, the augmentor fan 1006 may be about 80% more efficient (i.e., has more thrust) than the ducted fan 1004 at sea level, and about 50% more efficient at high altitude. Thus, the augmentor fan 1006 is especially powerful for takeoff.

The propulsor 1020 comprises the core engine 1002 and the ducted fan 1004 producing a combined core and ducted fan flow 1024. The propulsor 1020 also comprises an augmentor fan 1006 producing an augmentor fan flow 1022.

The low augmentor fan ratio configuration of the propulsor 1020 causes the propulsor 1020 to produce the augmentor fan flow 1022 at about 40% of total engine thrust, and the combined core and the ducted fan flow 1008 at about 60% of total engine thrust. The augmentor fan 1006 is configured to produce a substantially minimum level of noise. The power sharing drive system 312 may send most of the power to the ducted fan 1004, and the pitch angle of the augmentor fan 1006 may be configured for a low angle of attack to substantially minimize noise. Because of the low augmentor fan ratio configuration of the augmentor fan 1006, the engine can operate at a high power and rotation speed without excessive noise. The ability to independently vary the power transferred to the ducted fan 1004 and the augmentor fan 1006 to produce variable levels of the ducted fan flow 1008/1024 and the augmentor fan flow 1010/1022 respectively provides the variable cycle engine capability as mentioned above.

Figure 11:
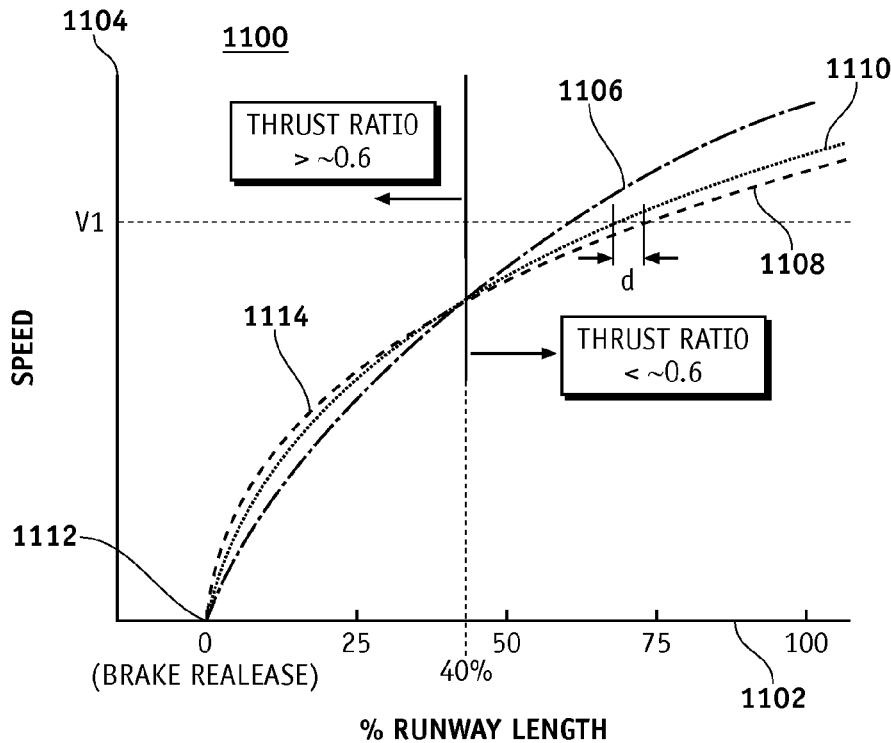
FIG. 11 is a graph illustrating speed vs. percent of runway length comparing various engine configurations to a propulsor configuration according to an embodiment of the disclosure.

FIG. 11 is a graph 1100 illustrating speed vs. percent of runway length comparing various engine configurations to a propulsor configuration according to an embodiment of the disclosure. The graph 1100 is for takeoff flight conditions showing exemplary variable augmentor fan thrust ratios (propeller thrust/total thrust) of the ultra-efficient aircraft propulsor 300 (propulsor 300). The graph 1100 shows. speed 1104 vs. percent of runway length 1102 for the existing ducted turbofan engine 100 on a ducted turbofan curve 1106, the existing propfan engine 200 on a propfan curve 1108, and the ultra-efficient aircraft propulsor 300 on an augmentor fan curve 1110.

The graph 1100 also illustrates a power sharing concept of the ultra-efficient aircraft propulsor 300 according to one or more embodiments of the disclosure. In practice, the power sharing can optimize runway performance while reducing takeoff field length (TOFL) as explained in more detail below. For a given takeoff placard thrust rating, turbo props and propfans provide greater initial acceleration at a very low speed but encounter rather rapid thrust lapse with forward speed. In contrast, ducted turbofans have less initial acceleration but greater available end-of-runway thrust. According to an embodiment of the disclosure, takeoff field length can be substantially minimized by changing the engine cycle, for example but without limitation, prior to an airplane achieving decision speed (e.g., about midway through a takeoff run). Accordingly, a low speed performance acceleration of the augmentor fan 306 of the propulsor 300 is utilized, and then the propulsor 300 is transitioned to a configuration utilizing the ducted fan 304 for the transition to lift off (e.g., at or near the end of the runway) when some speed is accumulated as explained in more detail below.

In this manner, during takeoff the thrust ratio (propeller thrust/total thrust) of the augmentor fan blades 308 of the augmentor fan 306 may be increased to greater than about 0.6 prior to transitioning to the ducted fan 304 and decreased to less than 0.6 after transitioning to the ducted fan 304, thereby optimizing the runway performance and minimizing the TOFL respectively. Transition between the augmentor fan 306 and the ducted fan 304 may be accomplished by automatically changing the pitch of the augmentor fan blades 308 in response to, for example but without limitation, logic in the airplane flight management computer systems. The logic may be based on flight parameters, such as but without limitation, throttle input as explained above, airspeed, altitude, and the like. As explained above, the ability to independently vary the power transferred to the airflow between the ducted fan 304 and the augmentor fan 306 provides the aforementioned variable cycle engine capability.

The ducted turbofan curve 1106 for the existing ducted turbofan engine 100 (FIG. 1) shows the existing ducted turbofan engine 100 starts with relatively low power up until, for example but without limitation, about 40% of the runway length 1102. Thereafter, the existing ducted turbofan engine 100 has a relatively high power. The existing ducted turbofan engine 100 has a small rotor diameter, and may have a smaller mass (smaller inertia) than the existing propfan engine 200 (FIG. 2) due to smaller fan blades. As a result, the existing ducted turbofan engine 100 can increase its engine rotation rate (spin up) faster than the existing propfan engine 200, and develops higher power later on the runway. The existing ducted turbofan engine 100 may have the shortest takeoff length to reach decision speed (V1). The decision speed V1 is an important parameter in that it may be preferable for the engine to be in a fixed configuration at the time the pilot commits to taking off. For example, for combinations of airplane weight, and airport conditions (e.g., wind-speed, temperature) where the optimum transition point approaches V1, logic in the airplane Flight Management System (FMS) can ensure that changes in the engine configuration are completed prior to V1. In practice, the airplane runway speed data is included in the FMS Thrust Ratio logic to allow for performing such an operation to suitability monitor engine configuration of the propulsor 300 prior to V1.

The propfan curve 1108 for the open-rotor propfan engine 200 shows the existing propfan engine 200 starts with relatively high power up until, for example but without limitation, about 40% of the runway length 1102. Thereafter, the existing propfan engine 200 has relatively low power. The existing propfan engine 200 generally has a large rotor diameter, and may have a larger mass (higher inertia) than the existing ducted turbofan engine 100 due to larger fan blades. As a result, the existing propfan engine 200 has a relatively large rotating mass. Therefore, the fan blades of the unducted propfan 204 of the existing propfan engine 200 can be substantially feathered and the large rotating mass can be spun-up to some degree before brake release 1112. After the brake release 1112, rotational energy of the fan blades can be released into the air flow driven by the unfeathered blades. Furthermore, the high efficiency of the existing propfan engine 200 is most effective at low speeds. As a result, the existing propfan engine 200 has a fast early acceleration 1114, but slower acceleration farther down the runway.

The augmentor fan curve 1110 shows the augmentor fan 306, according to an embodiment of the disclosure, by itself may have slightly less low speed performance than the existing propfan engine 200, but may have slightly better high speed performance. However, according to an embodiment of the disclosure, the ultra-efficient aircraft propulsor 300 also comprises the ducted fan 304. Thus, the ultra-efficient aircraft propulsor 300 may use higher thrust from the augmentor fan 306 above up to, for example but without limitation, about 40% of the runway length 1102, and the ducted fan 304 above, for example without limitation, about 40% of the runway length 1102. Thus, the ultra-efficient aircraft propulsor 300 can use a superior characteristic of both the augmentor fan 306 and the ducted fan 304 to enhance takeoff performance. The ultra-efficient aircraft propulsor 300 may reduce the takeoff length to reach V1 by an amount (d) compared to the existing propfan engine 200. By using the ducted fan 304 and the lower noise configuration of the augmentor fan blades 308 for the augmentor fan 306 at substantially during takeoff, noise is also reduced. The ability to tailor power split between the ducted fan 304 and the augmentor fan 306 can be, for example but without limitation, optimized for different airports and takeoff scenarios as a function of groundspeed, airspeed, main and/or nose gear on ground sensor signals, flap positions, aircraft weight, airspeed, altitude, dynamic pressure, radio altitude, proximity to flyover and/or sideline and/or airport-specific microphone locations and the like, to optimize field performance and noise.

Figure 12:
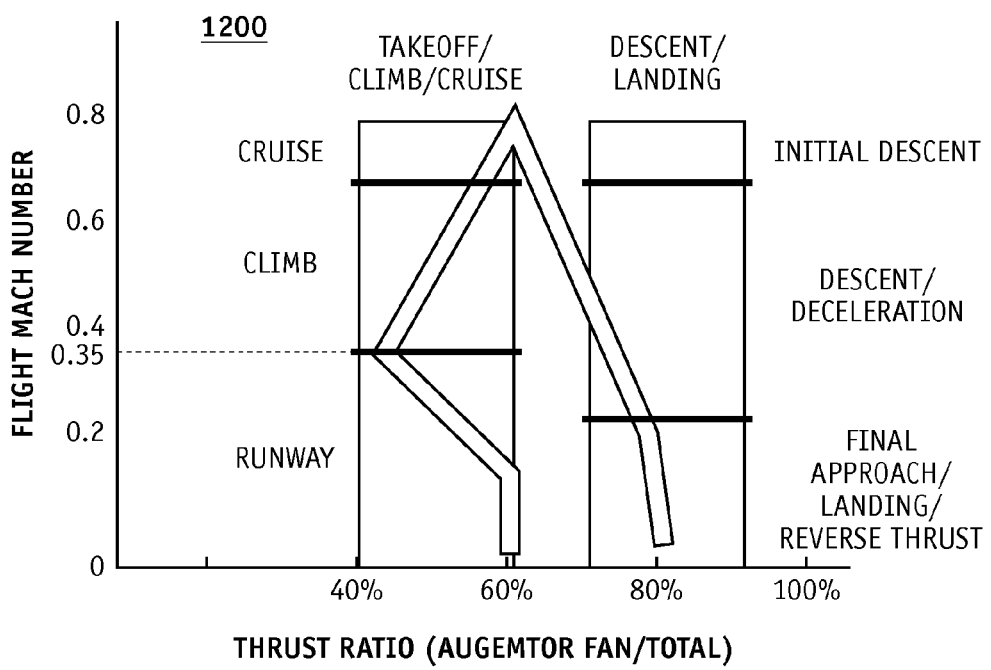
FIG. 12 is a graph showing flight Mach number vs. variable augmentor fan thrust ratio for an exemplary flight envelope according to an embodiment of the disclosure.

FIG. 12 is a graph showing flight Mach number (M) vs. variable augmentor fan thrust ratio for an exemplary flight envelope according to an embodiment of the disclosure. As explained above in the context of discussion of FIG. 11, during takeoff, an about 60% augmentor fan 306 thrust ratio may be used to enhance low speed takeoff acceleration, and reduced to about 40% of takeoff roll to enhance turbofan power and reduce noise. During climb in to a cruise flight segment over populated areas, a low noise profile is maintained, and as altitude increases, the power can be shifted to the higher efficiency high augmentor ratio (high augmentor fan thrust ratio). For example, at M equal to about 0.35, during the climb, the propulsor 300 uses an augmentor fan thrust ratio of about 40% and at M equal to about 0.8, during cruise, the propulsor 300 is backed-off to using about 60% augmentor fan thrust ratio again.

An additional capability provided by various embodiments of the disclosure entails the ability to tailor thrust ratio to specific airport noise monitoring systems. Specifically, certain airports such as Santa Ana (SNA), Brussels (BRU), Osaka (OSA), Munich (MUC) have numerous microphones placed in noise sensitive residential areas, each of which have stated substantially maximum noise levels as defined by the airport. Existing airplanes may have to alter their flight path and or rapidly modulate thrust to avoid exceeding stated noise limits which can increase pilot workload and can reduce passenger ride-comfort due to almost a sudden change in airplane attitude.

Future Flight Management Systems (FMS) systems may comprise databases of microphone locations to assist pilots with precise automatic throttle operation; however, the exemplary embodiments can utilize logic in the FMS that also comprises predefined optimum thrust ratio control logic so that noise can be tailored with less change in actual thrust produced resulting in less pilot workload and improved passenger comfort. During decent, the aircraft is mostly gliding; however, for safety the aircraft needs to have power readily available. Because the augmentor fan 306 can substantially feather its props to reduce thrust while maintaining rotational momentum, it can provide quick power simply by changing an angle of one or more of the augmentor fan blades 308. In this manner, the ultra-efficient aircraft propulsor 300 enhances safety.

Certain noise sensitive airports also encourage steep descents to substantially minimize noise. While a typical glide slope is about three degrees, angles as high as about six degrees are standard approach vector by certain airports including London City (LCY). Airplane wing design largely controls these angles, however, a factor that can limit descent angle is a rate at which engines can "spool up" or achieve usable thrust in an emergency. Embodiments of the disclosure, enables an engine such as the propulsor 300 to achieve a usable thrust faster than the ducted turbofan engine 100. In this manner, embodiments of the disclosure can enable an aircraft to achieve steeper and/or quieter descents into noise-sensitive airports.

Figure 13:
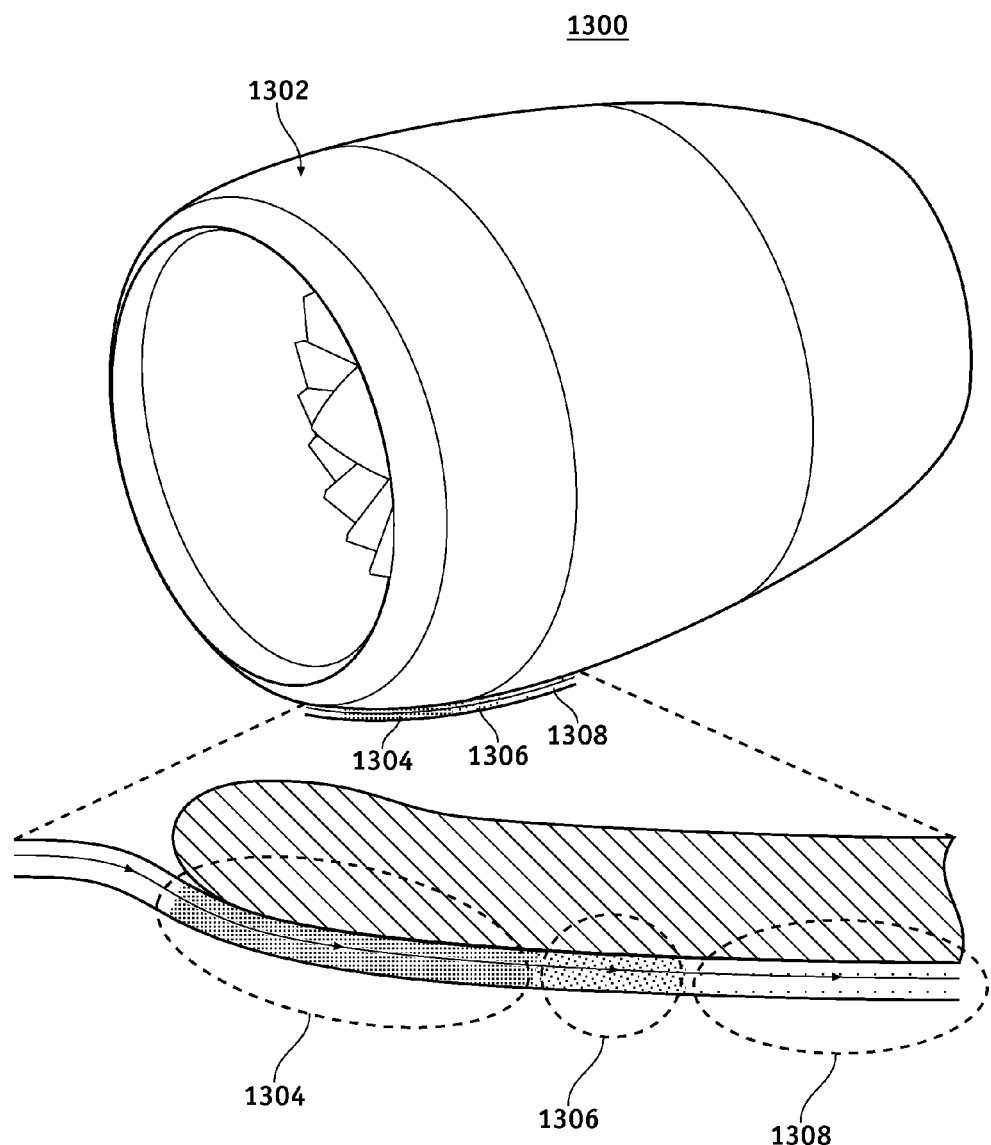
FIG. 13 is an illustration of an exemplary natural laminar flow on an engine nacelle for a conventional turbofan.

FIG. 13 is an illustration of an exemplary natural laminar flow on an engine nacelle 1302 for a conventional turbofan. The engine nacelle 1302 on the conventional turbofan is generally designed to be naturally laminar for cruise speeds. However, at lower speeds and flight attitudes, front portions of the engine nacelle 1302 have a laminar boundary layer 1304, but other parts of the engine nacelle 1302 may not. At lower speeds, the laminar boundary layer 1304 transitions 1306 into a turbulent boundary layer 1308.

Figure 14:
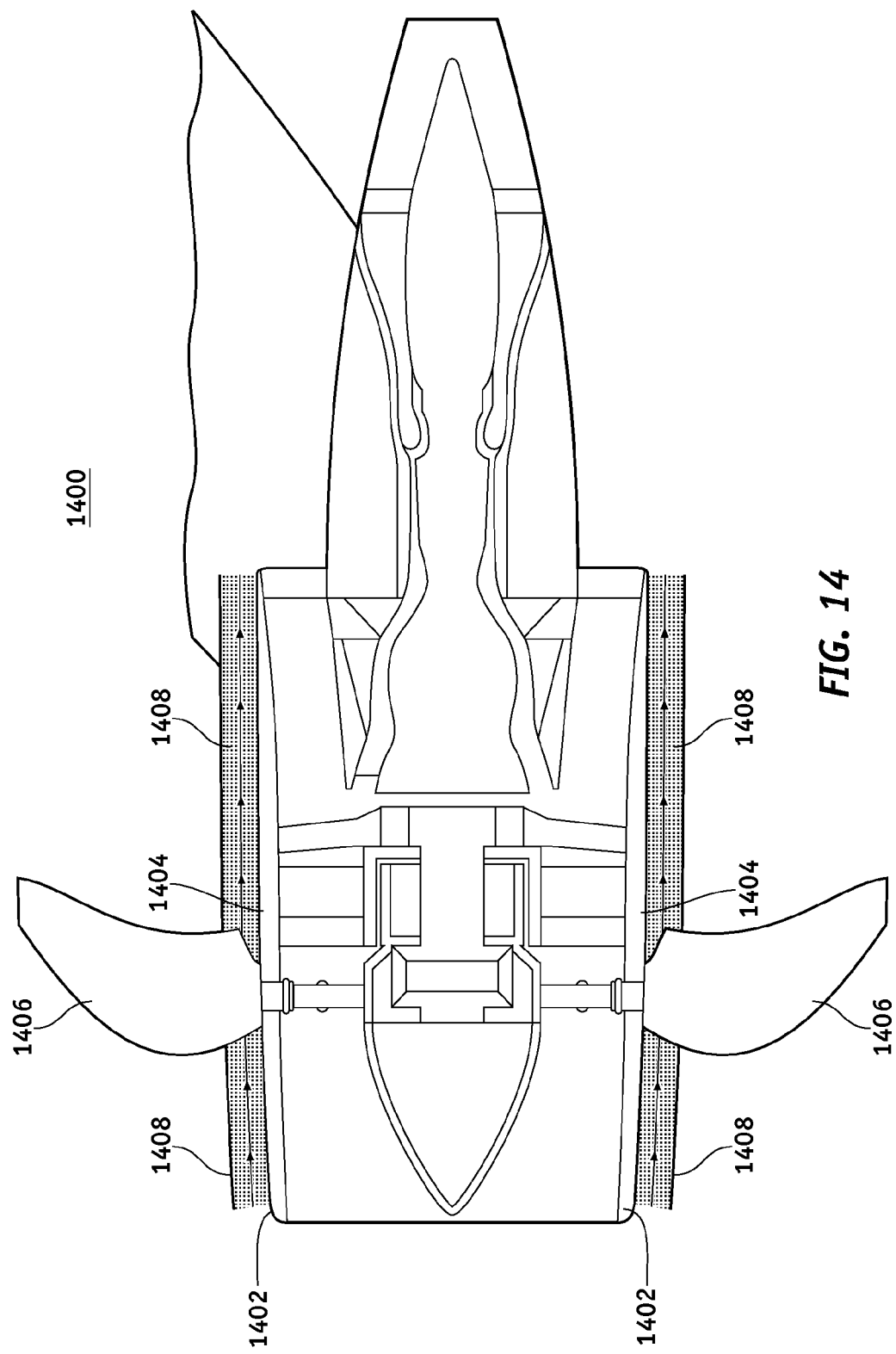
FIG. 14 is an illustration of an exemplary extended natural laminar flow on an engine nacelle of an exemplary ultra-efficient aircraft propulsor with an augmentor fan according to an embodiment of the disclosure.

FIG. 14 is an illustration of an exemplary extended natural laminar flow 1408 on an engine nacelle of an exemplary ultra-efficient aircraft propulsor with an augmentor fan 1406 according to an embodiment of the disclosure. Because the augmentor fan 1406 accelerates, the air around the nacelle to a high speed, the boundary layer is energized, thereby laminarizing the flow over a greater region of the trailing nacelle portion 1404 as well as the leading nacelle portion 1402, thereby reducing drag.

Figure 15:
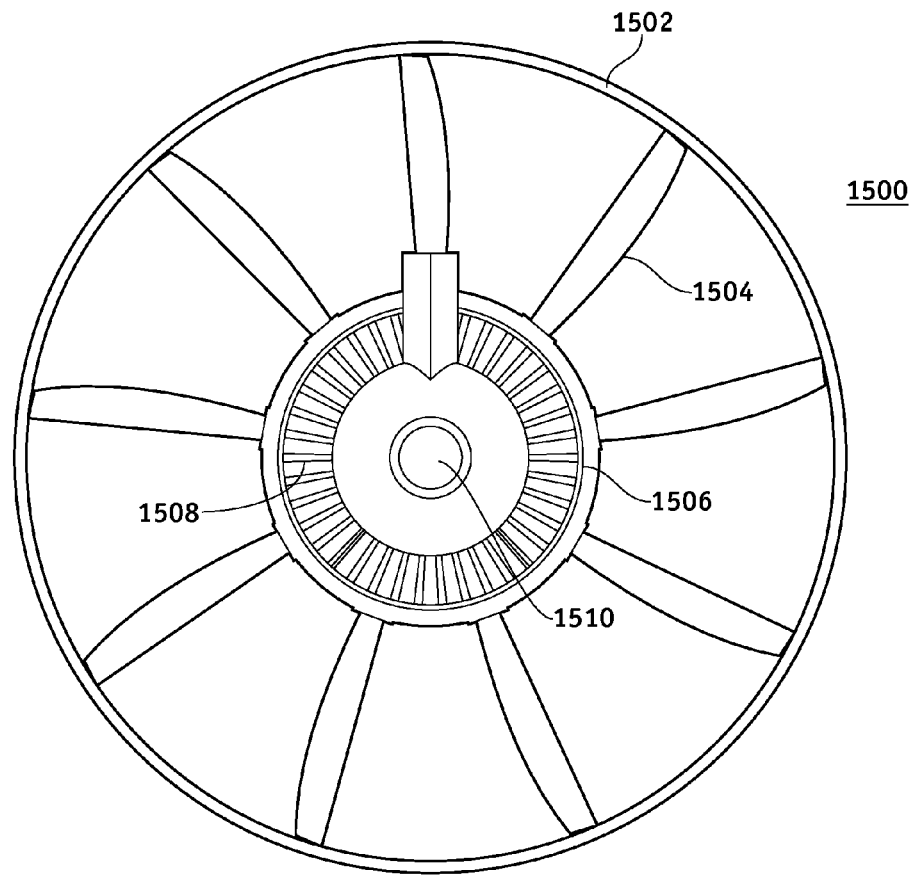
FIG. 15 is an illustration of a rear view of an augmentor fan showing an augmentor fan tip ring according to an embodiment of the disclosure.

FIG. 15 is an illustration of a rear view of an agumentor fan 1500 showing an augmentor fan tip ring 1502 (tip ring) according to an embodiment of the disclosure. The augmentor fan tip ring 1502 circumscribes the augmentor fan 1504 and blades thereof. The augmentor fan tip ring 1502 may also circumscribe a ducted fan 1508 and/or a core engine 1510. The augmentor fan tip ring 1502 reduces or eliminates blade tip vortices. Reducing or eliminating blade tip vortexes can reduce drag and noise. The augmentor fan tip ring 1502 can also provide a containment to ensure that damaged blades do not fly loose, which may also offer an improvement in passenger perception and preference. In practice, the augmentor fan tip ring 1502 may have a slightly noncircular shape when the augmentor fan 1504 is not rotating. When the augmentor fan 1504 is rotating, the rotational loads, cause the augmentor fan tip ring 1502 to take a circular or near-circular shape at typical operational rotation speeds. An average chord of the augmentor fan tip ring 1502 may be, for example and without limitation, between about 0.025 and about 0.5 of an average chord of the fan cowl 1506. The augmentor fan tip ring 1502 may comprise, for example but without limitation, a ring airfoil configuration, where an average chord of the ring airfoil may be, for example and without limitation, between 1 and 5 times the average chord of blades of the augmentor fan 1504. The average thickness to average chord ratio of the ring airfoil may be, for example but limitation, between about 0.03 and about 0.30. The augmentor fan 1504 may have blade pitch variability operable to allow coupling of augmentor fan blades to the augmentor fan tip ring 1502.

Figure 16:
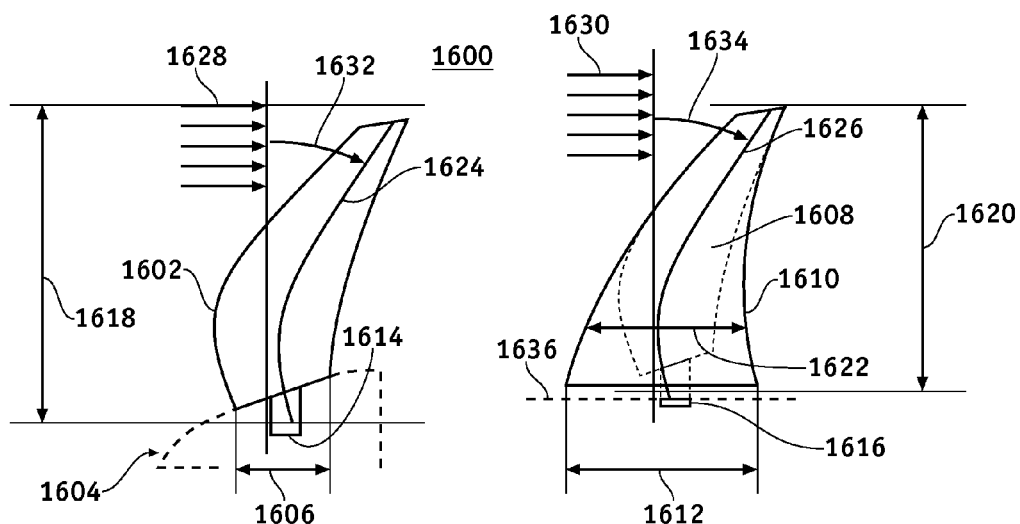
FIG. 16 is an illustration of an exemplary shark fin blade according to an embodiment of the disclosure in comparison to a conventional scimitar blade.

FIG. 16 is an illustration of an exemplary shark fin blade 1608 according to an embodiment of the disclosure in comparison to a conventional scimitar blade 1602. The conventional scimitar blade 1602 comprises a narrow root chord 1606 due to a requirement to attach to a conventional propfan hub/spinner 1604. In contrast, according to an embodiment of the disclosure, a larger width of the augmentor hub ring 408 (FIG. 4) allows a more trapezoidal (shark fin) shape planform 1610 that has greater lift at the root 1616. In this manner, the root chord 1612 of the shark fin blade 1608 can be much wider than the width of the narrow root chord 1606 of the conventional scimitar blade 1602. The shark fin blade 1608 can utilize an end-plating effect (root loading) to provide high lift at the root 1616. The root 1616 is inherently stronger than would be possible for the conventional propfan hub/spinner 1604 since it can be bonded to an augment hub ring portion 1636. In this manner, the augmentor fan blades 406 (FIG. 4) can have airfoil acoustic shaping features.

Aerodynamic tip-sweep 1634 of a mid chord line 1626 relative to a plane perpendicular to a local inflow streamlines 1630 can be up to about 60 degrees or more. For current art, aero tip-sweep 1632 of a mid chord line 1624 relative to a plane perpendicular to a local inflow streamlines 1628 can be generally not more than about 40-45 degrees.

Figure 17:
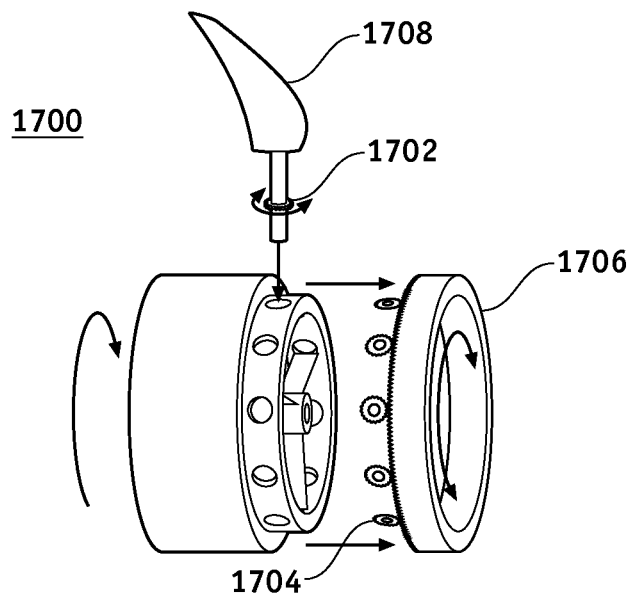
FIG. 17 is an illustration of an exemplary augmentor fan blade pitch control unit (PCU) mechanism according to an embodiment of the disclosure.

FIG. 17 is an illustration of an exemplary augmentor fan blade pitch control unit (PCU) mechanism 1700 according to an embodiment of the disclosure. A rotating gear ring 1706 provides torque to all the augmentor fan blade roots 1702 simultaneously from all the PCU drives 1704 for pitch control. The augmentor fan blade roots 1702 may be paired with PCU drives 1704 coupled to the rotating gear ring 1706. Thereby, if one or more of the PCU drives 1704 fails; the remaining PCU drives 1704 can still drive all the augmentor fan blades 1708. In this manner, a number of PCU drives 1704 can significantly be reduced. The rotating gear ring 1706 is operable to ensure same pitch angle for all the augmentor fan blades 1708; therefore, no counter weight may be needed. The rotating gear ring 1706 may be, for example but without limitation, automatically driven electrically, hydraulically, pneumatically, a combination thereof, and the like. The PCU drives 1704 can be controlled automatically via a flight management system in response to data from an engine control unit ECU and the like.

Figure 18:
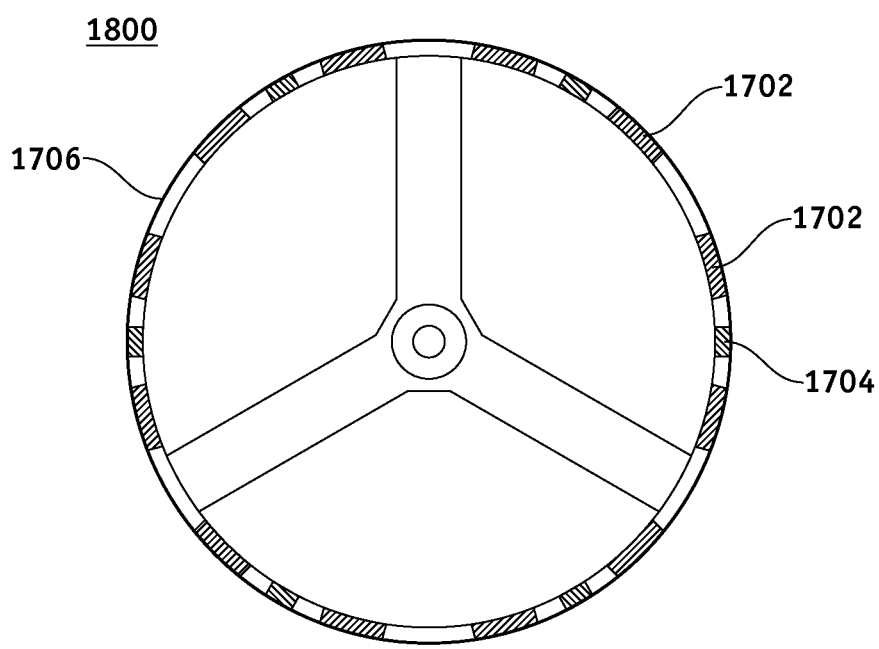
FIG. 18 is an illustration of a front view of an exemplary rotating gear ring of an augmentor fan blade pitch control unit (PCU) according to an embodiment of the disclosure.

FIG. 18 is an illustration of a front view of an exemplary rotating gear ring 1706 of an augmentor fan blade pitch control unit (PCU) according to an embodiment of the disclosure. The rotating gear ring 1706 comprises augmentor fan blade roots 1702 paired with control gears 1704 (PCU drives 1704) and coupled to the rotating gear ring 1706.

Figure 19:
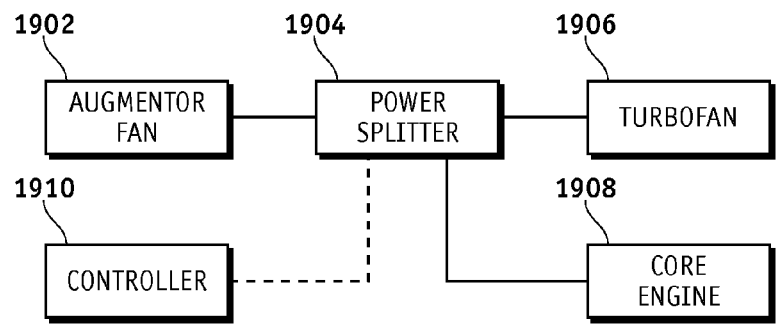
FIG. 19 is an illustration of an exemplary block diagram for a power sharing drive system operable to use for power sharing control according to an embodiment of the disclosure.

FIG. 19 is an illustration of an exemplary block diagram for a power sharing drive system 1900 operable to use for power sharing control of the propulsor 300 according to an embodiment of the disclosure. The power sharing drive system 1900 comprises an augmentor fan 1902, a power splitter 1904, a turbofan 1906, a core engine 1908, and a controller 1910. The power sharing drive system 1900 has a structure that is similar to the ultra-efficient aircraft propulsor 300, common features, functions, and elements will not be redundantly described herein. The power sharing drive system 1900 may comprise gears or other systems operable to transmit power concurrent with changing revolutions per minute.

The power splitter 1904 is operable to receive power from the core engine 1908 (e.g., in the form of torque), and transmit the power to the augmentor fan 1902 and/or the turbofan 1906. The power splitter 1904 splits the power between the augmentor fan 1902 and/or the turbofan 1906 as directed by the controller 1910. The controller 1910 may set the power split based on flight parameters such as, for example but without limitation, speed (e.g., Mach number), dynamic pressure, altitude, weight, flap configuration, landing gear parameters, takeoff status, landing status, approach status, cruise status, and the like. The flight parameters may be obtained from, for example but without limitation, the flight control system or sensors of the aircraft. The power splitter 1904 may comprise, for example but without limitation, a gear system (FIG. 21), a hydraulic system, separate turbine stages (e.g., spools) for the turbofan and the augmentor fan, and the like. The power splitter 1904 may be used to vary respective RPM and/or relative RPM of the augmentor fan 1902 and/or the turbofan 1906.

The controller 1910 is configured to control, for example but without limitation, at least one of core engine power, core engine thrust, core engine RPM, core engine fuel flow, core engine critical temperature parameter, fan thrust, fan RPM, augmentor fan blade pitches, augmentor fan thrust, augmentor fan RPM, and the like. The controller 1910 is further configured to control at least a fraction of propulsor 300 total mass flow which is run through the augmentor fan 1902, and a fraction of propulsor total power which is run through the turbofan 1906. The power sharing control allows optimization for minimum fuel burn, minimum operational cost, minimum emissions and/or minimum noise.

Figure 20A:
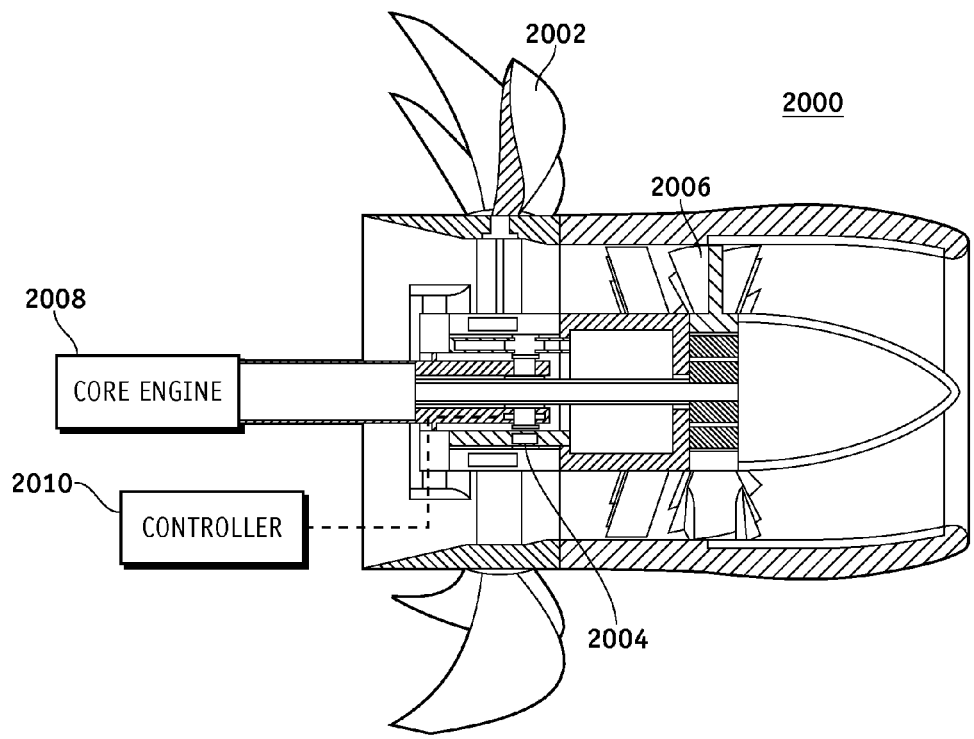
FIG. 20A is an illustration of an exemplary ultra-efficient aircraft propulsor using a power sharing drive system according to an embodiment of the disclosure.
Figure 20B:
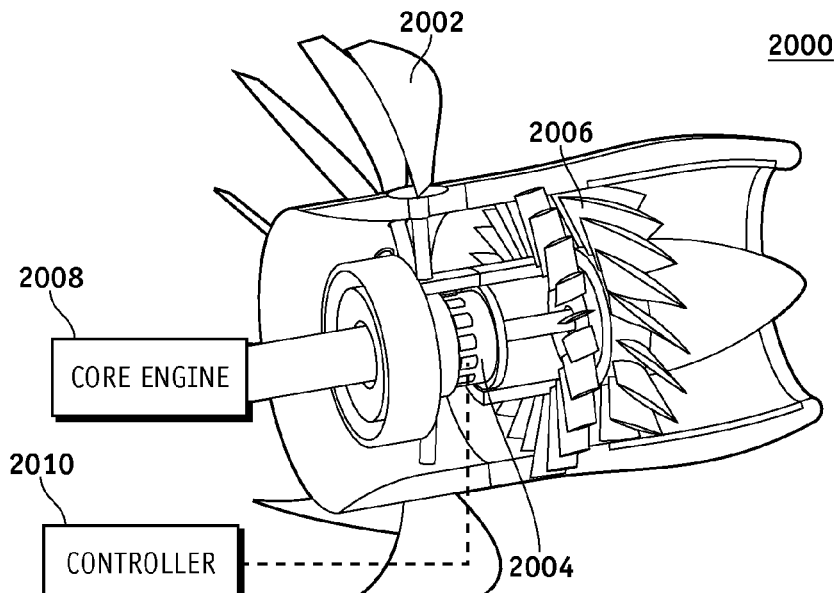
FIG. 20B is an illustration of a cut-away perspective view of the exemplary ultra-efficient aircraft propulsor using a power sharing drive system according of FIG. 20A.

FIG. 20A is an illustration of an exemplary ultra-efficient aircraft propulsor 2000 using a power sharing drive system 2004 (power splitter 2004) according to an embodiment of the disclosure. FIG. 20B is an illustration of a cut-away perspective view of the exemplary ultra-efficient aircraft propulsor 2000 using the power sharing drive system 2004. The ultra-efficient aircraft propulsor 2000 has a structure that is similar to the ultra-efficient aircraft propulsor 300 and power sharing drive system 1900, common features, functions, and elements will not be redundantly described herein.

The ultra-efficient aircraft propulsor 2000 comprises an augmentor fan 2002, a power splitter 2004, a turbofan 2006 (ducted fan 2006), a core engine 2008, and a controller 2010. The power splitter 2004 may be, for example but without limitation, a differential gearbox drive system as explained below.

Figure 21:
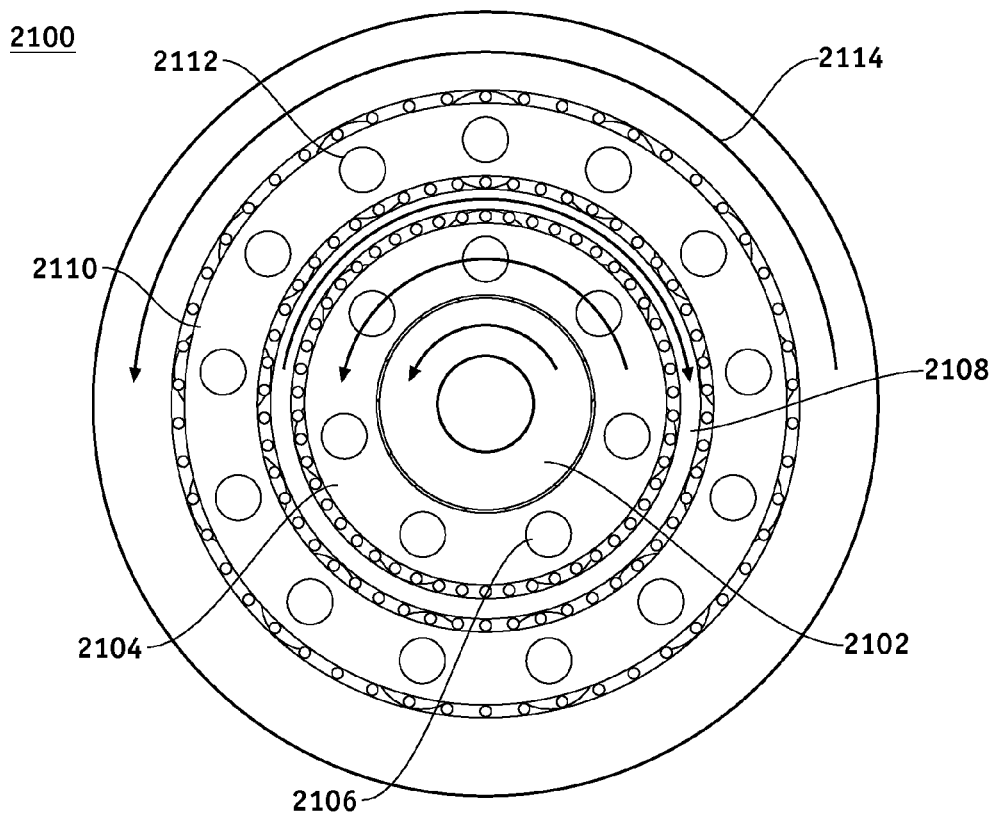
FIG. 21 is an illustration of an exemplary differential gearbox drive system that can be used as a power splitter according to an embodiment of the disclosure.

FIG. 21 is an illustration of an exemplary differential gearbox drive system 2100 that can be used as the power splitter 2004 according to an embodiment of the disclosure. The differential gearbox drive system 2100 has a structure that is similar to the power splitter 1904 in FIG. 19, common features, functions, and elements will not be redundantly described herein. The differential gearbox drive system 2100 comprises an output 2102 to turbofan 2006 (FIG. 20A/20B), a power input shaft 2104 coupled to the core engine 2008 (FIG. 20A/20B), a plurality of differential spider gears 2106, a power transfer ring 2108, a stationary cowl and propulsion support 2110, a plurality of planetary power transfer gears 2112, and an augmentor output 2114 to the augmentor fan 2002 (FIG. 20A/20B). In practice, the differential gearbox drive system 2100 is operable to receive power from the core engine 2008 (e.g., in the form of torque) via, for example, the power input shaft 2104, and transmit the power to the augmentor fan 2002 and/or the turbofan 2006 via the augmentor output 2114, and the output 2102 respectively. The differential gearbox drive system 2100 is configured to suitably split the power between the augmentor fan 2002 and/or the turbofan 2006 as directed by the controller 2010 (FIG. 20A/20B). In response to input from the controller 2010, the differential gearbox drive system 2100 provides a suitable gearing mechanism via the differential spider gears 2106 and the planetary power transfer gears 2112 to carry operation of the ultra-efficient aircraft propulsor 300 (FIG. 3).

FIGS. 22-25 are illustrations of various embodiments of exemplary ultra-efficient aircraft propulsors according to the present disclosure. Embodiments shown in FIGS. 22-25 comprise a structure that is similar to the ultra-efficient aircraft propulsor 300 and the power sharing drive system 1900, common features, functions, and elements will not be redundantly described herein.

Figure 22:
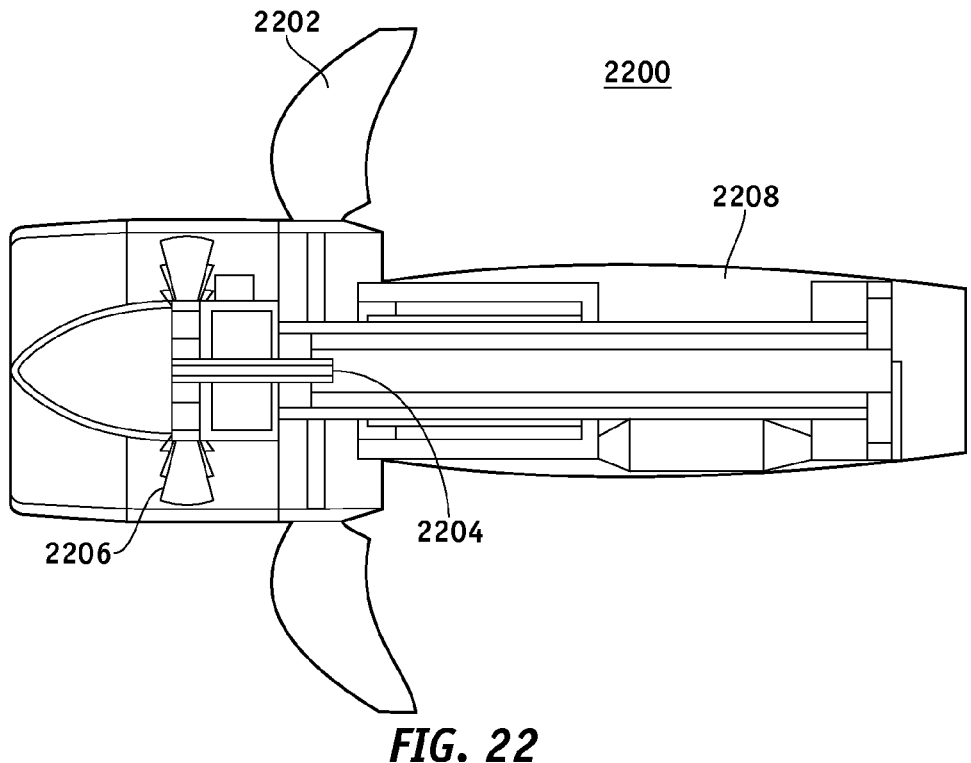
FIG. 22 is an illustration of an exemplary ultra-efficient aircraft propulsor showing a single rotor tractor configuration using a power sharing drive system according to an embodiment of the disclosure.

FIG. 22 is an illustration of an exemplary ultra-efficient aircraft propulsor 2200 showing a single rotor tractor configuration using a power sharing drive system according to an embodiment of the disclosure. The ultra-efficient aircraft propulsor 2200 comprises an augmentor fan 2202, a power splitter 2204, a turbofan 2206, and a core engine 2208. In the embodiment shown in FIG. 22, a power sharing differential gearbox drive system such as the power splitter 2204 is used for power sharing control. The power splitter 2204 comprises a puller or tractor configuration.

Figure 23:
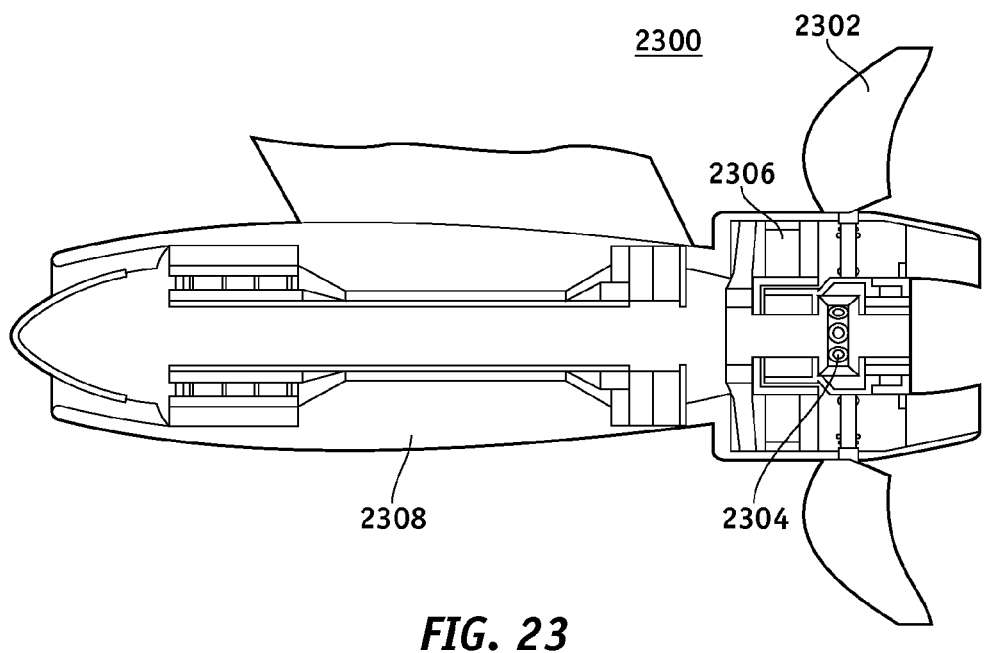
FIG. 23 is an illustration of an exemplary ultra-efficient aircraft propulsor showing a single rotor pusher configuration using a power sharing drive system according to an embodiment of the disclosure.

FIG. 23 is an illustration of an exemplary ultra-efficient aircraft propulsor 2300 showing a single rotor pusher configuration using a power sharing drive system according to an embodiment of the disclosure. The ultra-efficient aircraft propulsor 2300 comprises an augmentor fan 2302, the power splitter 2304, a turbofan 2306, and a core engine 2308. In the embodiment shown in FIG. 23, an exemplary power sharing differential gearbox drive system such as the power splitter 2304 is used for power sharing control.

Figure 24:
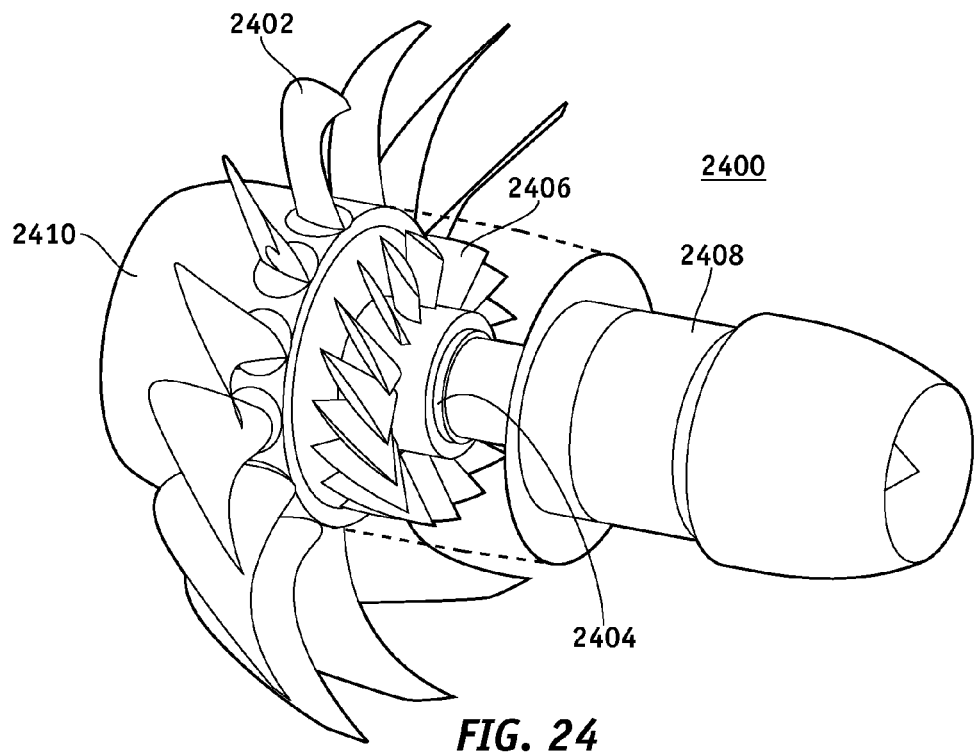
FIG. 24 is an illustration of an exemplary ultra-efficient aircraft propulsor showing a single rotor tractor configuration with an augmentor fan in located in front of the turbofan using a power sharing drive system according to an embodiment of the disclosure.

FIG. 24 is an illustration of an exemplary ultra-efficient aircraft propulsor 2400 (propulsor 2400) showing a single rotor tractor configuration with an augmentor fan 2402 located forward of a turbofan 2406 using a power sharing differential gearbox drive system 2404 (power splitter 2404) driven by a core engine 2408 according to an embodiment of the disclosure. The power sharing differential gearbox drive system 2404 comprises a puller configuration. Since the augmentor fan 2402 is located forward of the turbofan 2406, a front portion 2410 of the propulsor 2400 (e.g., a front portion of a fan cowl) may be designed to rotate with the augmentor fan 2402.

Figure 25:
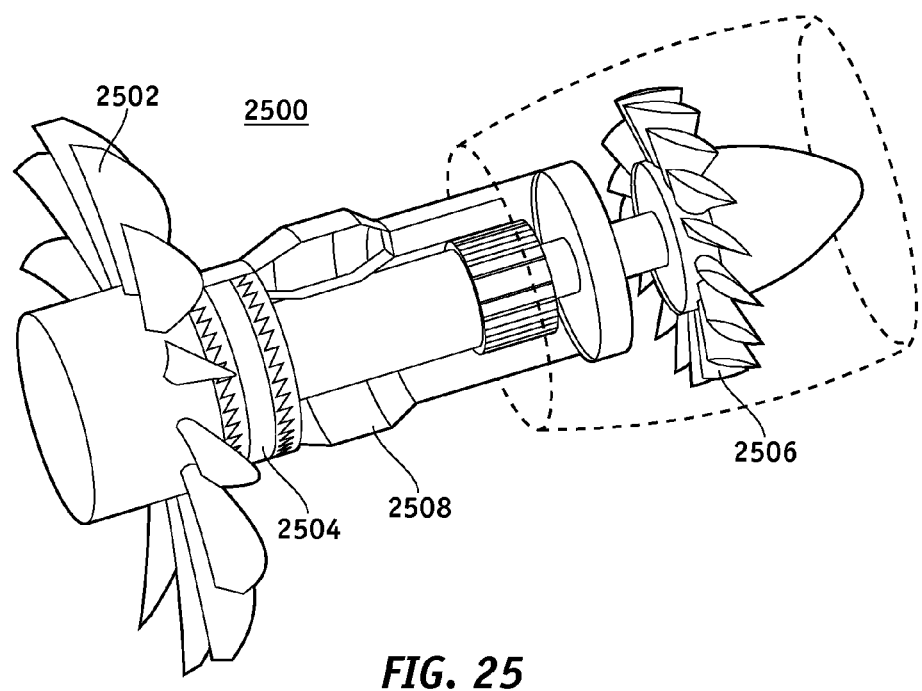
FIG. 25 is an illustration of an exemplary ultra-efficient aircraft propulsor showing a single rotor pusher configuration and a forward turbofan using a power sharing drive system according to an embodiment of the disclosure.

FIG. 25 is an illustration of an exemplary ultra-efficient aircraft propulsor 2500 (propulsor 2500) showing a single rotor pusher configuration with a forward turbofan puller configuration using a power sharing drive system according to an embodiment of the disclosure. The ultra-efficient aircraft propulsor 2500 comprises an augmentor fan 2502, a power splitter 2504, a turbofan 2506, and a core engine 2508. In the embodiment shown in FIG. 25, an exemplary power sharing differential gearbox drive system such as the power splitter 2504 is used for power sharing control. The propulsor 2500 comprises a puller turbofan 2506 configuration and a pusher augmentor fan 2502 configuration driven by the power splitter 2504.

Figure 26A:
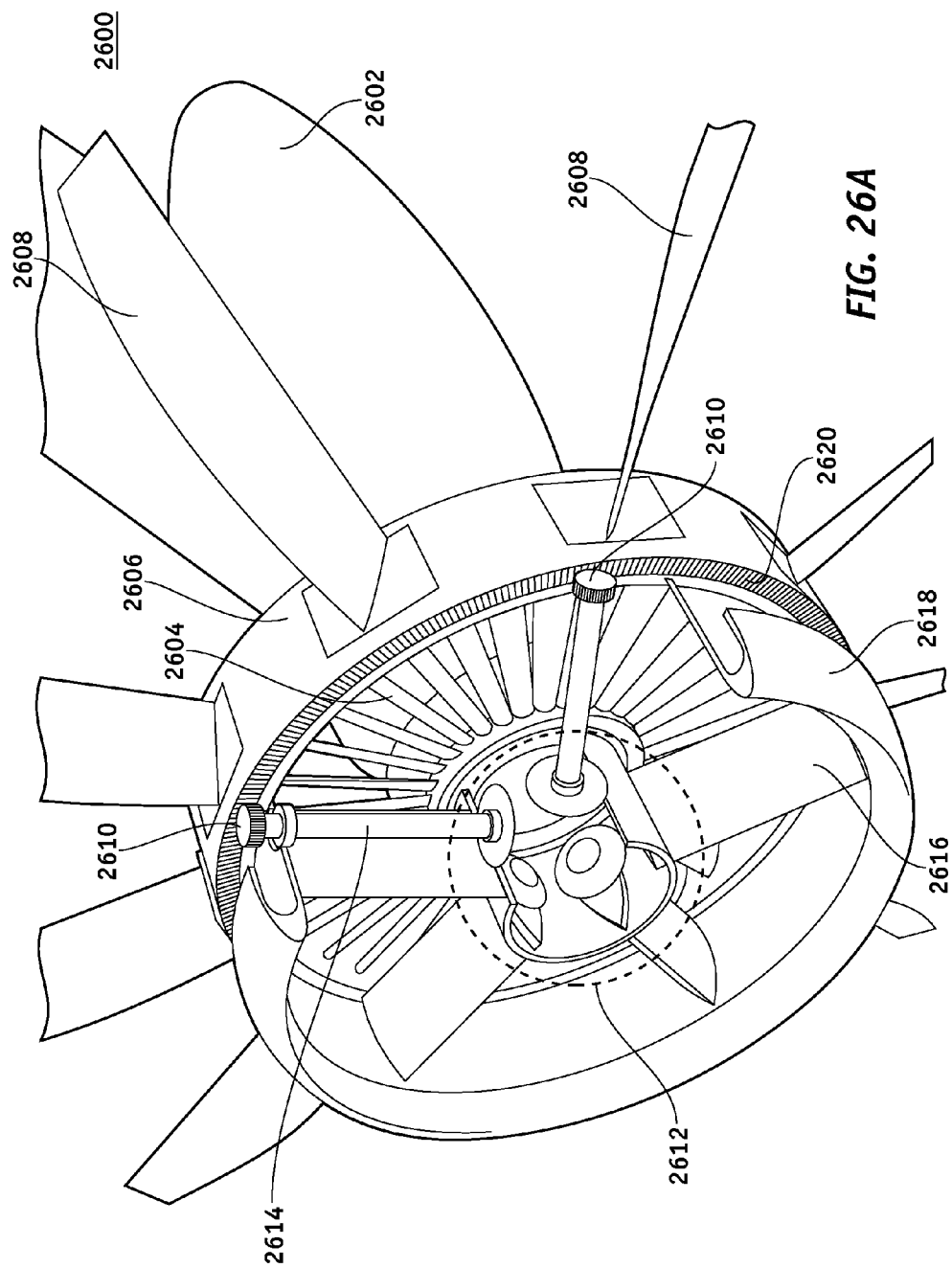
FIG. 26A is an illustration of a perspective view of an exemplary ultra-efficient aircraft propulsor using a powered augmentor fan hub rotor according to an embodiment of the disclosure.

FIG. 26A illustrates a perspective view of an exemplary ultra-efficient aircraft propulsor 2600 using a powered augmentor fan hub rotor according to an embodiment of the disclosure. The ultra-efficient aircraft propulsor 2600 comprises a core engine 2602, a ducted fan 2604, an augmentor hub ring 2606, and a plurality of augmentor fan blades 2608. As shown in FIG. 26, the augmentor hub ring 2606 may, without limitation, surround and shroud a ducted fan 2604.

As shown in FIG. 26, roots (1616 in FIG. 16) of each of the augmentor fan blades 2608 are coupled to the augmentor hub ring 2606, which may be, without limitation, substantially coplanar with the fan cowl 2618. The augmentor hub ring 2606 is configured to rotate. The augmentor hub ring 2606 comprises blade pitch variability permitting coupling of the augmentor fan blades 2608. In one embodiment, the augmentor hub ring 2606 is substantially located on an outer circle of larger size and surrounding the outer perimeter of the fan cowl 2618.

The augmentor hub ring 2606 comprises a driven gear ring 2620 around a periphery of the augmentor hub ring 2606 and coupled to connecting gear elements 2614 that transmit power from at least one driving gear ring 2612. The at least one driving gear ring 2612 may be coupled to and rotationally driven by power from the core engine 2602 and/or the ducted fan 2604. The connecting gear elements 2614 are contained in a plurality of struts 2616 to improve aero dynamics and protect the connecting gear elements 2614. The augmentor hub ring 2606 may be driven by the same number of struts 2616 as the number of the augmentor fan blades 2608, or may use a smaller or larger number of struts 2616 to directly or indirectly drive a rotation of the augmentor hub ring 2606. Gear sprockets 2610 of the connecting gear elements 2614 each may comprise a driving differential gear for transmitting power from one or more power shafts from the core engine 2602, while concurrently changing revolutions per minute.

The number of struts 2616 (i.e., 5 struts) is smaller than the number of the augmentor fan blades 2608 (i.e., 10 blades); the small number of struts 2616 minimizes disruption of the air flow of the ducted fan 2604. The arrangement of ultra-efficient aircraft propulsor 2600 with a large diameter augmentor fan hub or ring allows the number of the augmentor fan blades 2608 to be large, which minimizes noise as explained above. The augmentor hub ring 2606 may be structurally coupled to the fan cowl 2618.

Figure 26B:
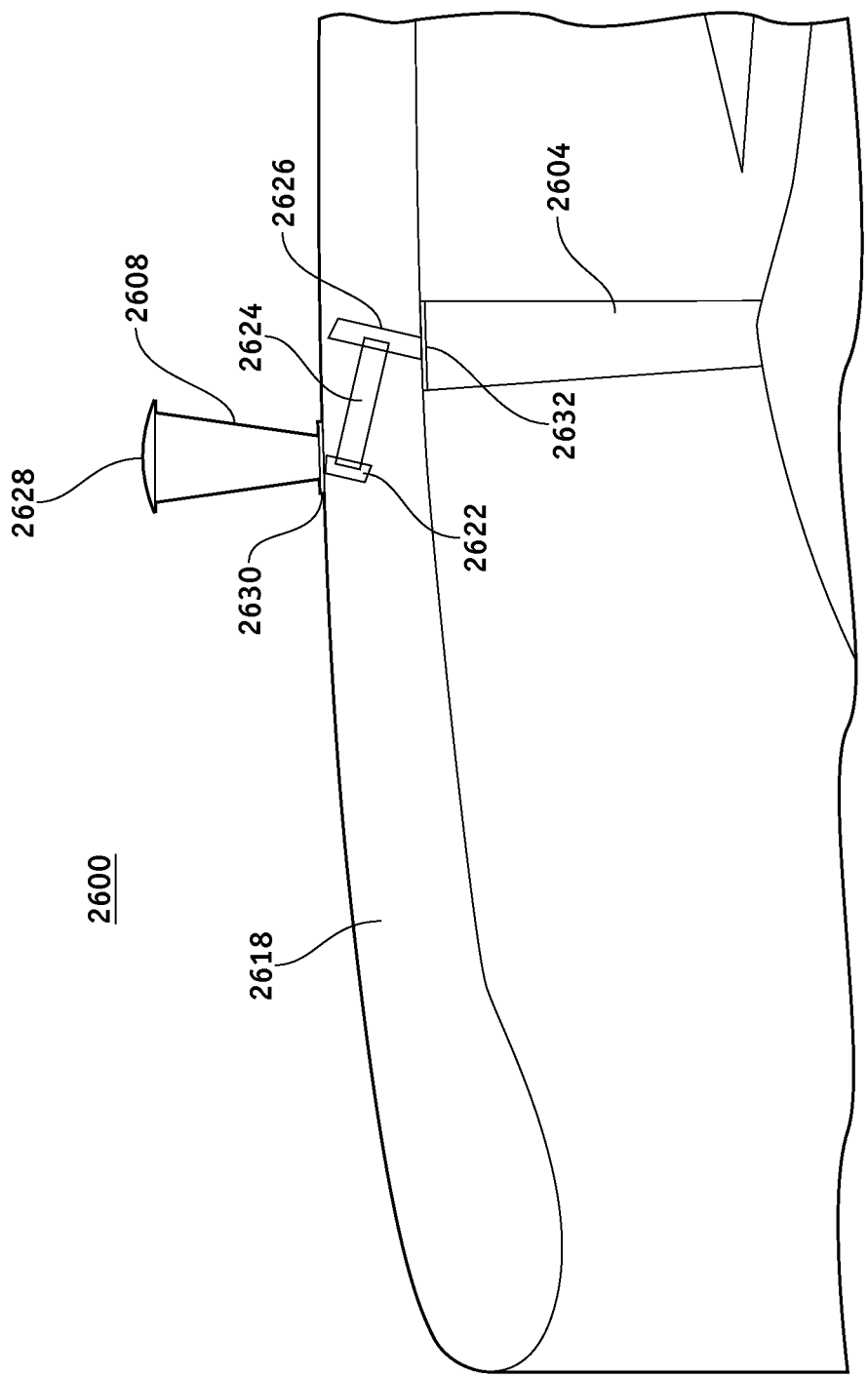
FIG. 26B is an illustration of a schematic cross sectional view of a portion of an exemplary ultra-efficient aircraft propulsor using a powered augmentor hub rotor driven by a turbofan according to an embodiment of the disclosure.

FIG. 26B is an illustration of a schematic cross sectional view of a portion of an exemplary ultra-efficient aircraft propulsor using a powered augmentor hub rotor driven by a turbofan according to an embodiment of the disclosure. For the embodiment shown in FIG. 2B, an augmentor fan tip ring 2628 is coupled to the augmentor fan blades 2608, and is rotationally driven using power from the ducted fan 2604. A first gear sprocket 2626 is engaged by a driving gear ring 2632 of the turbofan 2604. A shaft 2624 couples the first gear sprocket 2626 and a second gear sprocket 2622. The second gear sprocket 2622 engages a driven gear ring 2630 on the augmentor hub tip ring 2628. A circumference of the second gear sprocket 2622 may be less than a circumference of the first gear sprocket 2626, to cause an effective gearing where the rotational RPM of the driven gear ring 2632 can be reduced relative to the rotational RPM of the driving gear ring 2632.

Figure 27:
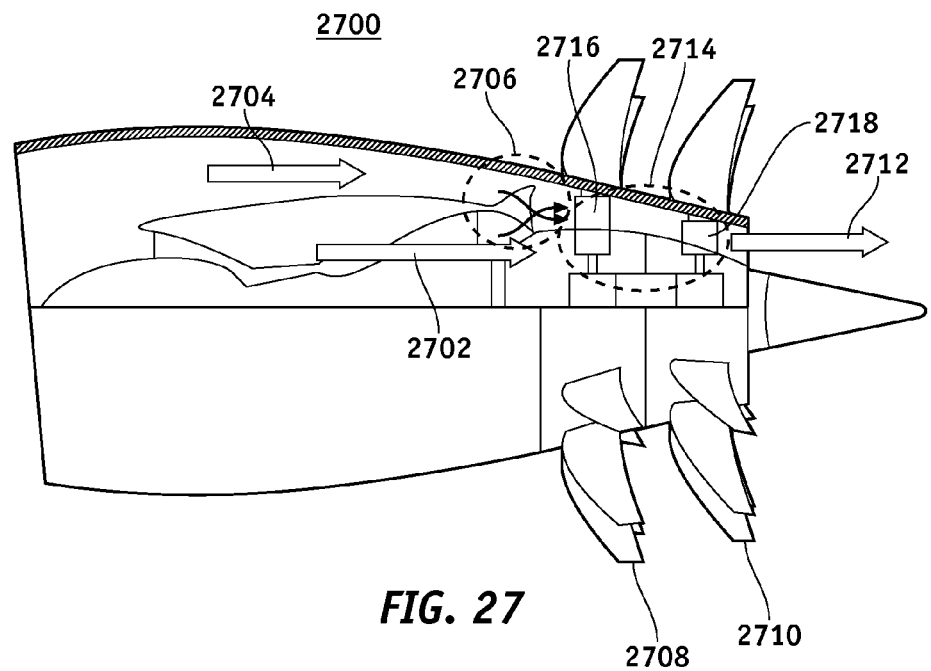
FIG. 27 is an illustration of an exemplary dual pusher configuration of an ultra-efficient aircraft propulsor utilizing a lobed mixer to provide cooled flow to aerodynamically drive an augmentor fan according to an embodiment of the disclosure.

FIG. 27 is an illustration of an exemplary dual pusher configuration of an ultra-efficient aircraft propulsor 2700 (propulsor 2700) utilizing a lobed mixer to provide cooled flow to aerodynamically drive an augmentor fan according to an embodiment of the disclosure. The propulsor 2700 has a structure that is similar to the ultra-efficient aircraft propulsor 300, common features, functions, and elements will not be redundantly described herein. The propulsor 2700 comprises a lobed mixer 2706, contra-rotating augmentor fans 2708 and 2710, and power sharing drive system 2714. The propulsor 2700 uses no gear to drive the contra-rotating augmenter fans 2708 and 2710. The lobed mixer 2706 mixes the cold turbofan air 2704 with a hot core engine exhaust 2702 to produce a cooled mixed flow 2712 which can directly drive the contra-rotating augmentor fans 2708 and 2710 (power turbine). The cooled mixed flow 2712 contrasts with pervious existing art that used the hot core engine exhaust 2702 to directly drive propfans. The lower temperature reduces demand for auxiliary cooling systems (e.g., cooling turbine vanes) and allows use of less high temperature resistant materials, lowering cost, reducing noise, reducing maintenance, and enhancing performance. In this manner, cooled gasses from the lobed mixer 2706 reduces temperature related wear on, for example but without limitation, the contra-rotating augmenter fans 2708 and 2710 and pitch control unit (PCU) drives 1704 of the contra-rotating augmenter fans 2708 and 2710. The power sharing drive system 2714 may comprise variable vanes 2716 and 2718 operable to change configuration to vary power to the contra-rotating augmentor fans 2708 and 2710 respectively. As shown in FIG. 27, mounting the propulsor 2700 at an aft end of an engine in a pusher configuration allows for a smaller overall propulsor diameter of the contra-rotating augmentor fans 2708 and 2710 since propulsor diameter is then not dependent on a size of a turbofan. Configuration of the propulsor 2700 allows mounting the engine, for example but without limitation, under wings of an aircraft.

Figure 28:
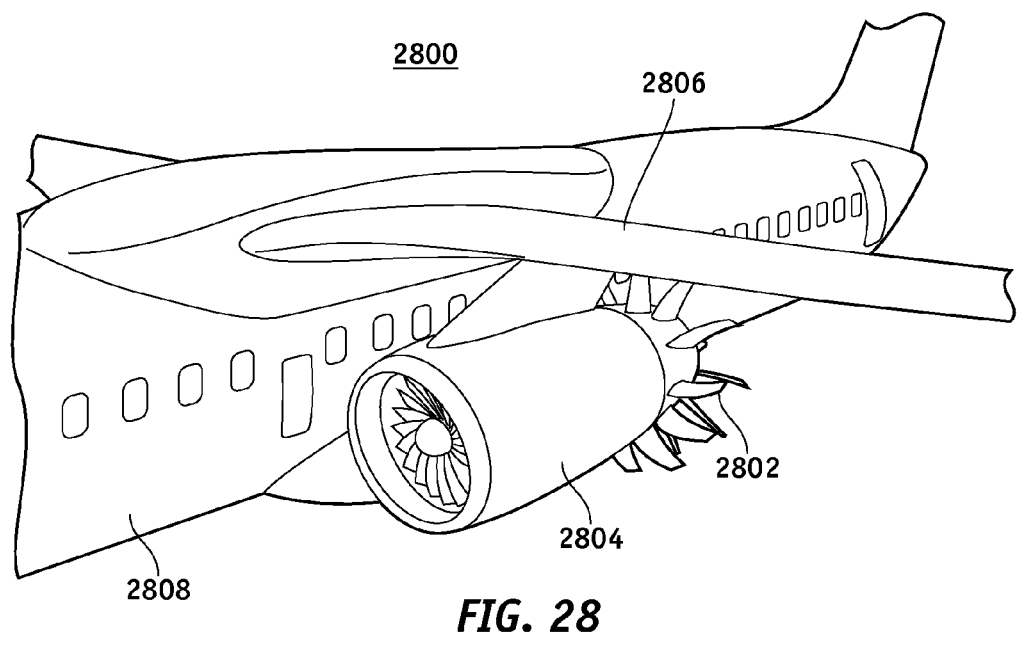
FIG. 28 is an illustration of a perspective view of an exemplary under wing mounting of a dual pusher configuration of an ultra-efficient aircraft propulsor with an augmentor fan according to an embodiment of the disclosure.

FIG. 28 is an illustration of a perspective view of an exemplary under wing mounting of a contra-rotating dual pusher configuration of an ultra-efficient aircraft propulsor (propulsor 2804) with an augmentor fan according to an embodiment of the disclosure. As shown in FIG. 28, the propulsor 2804 comprising augmentor fans 2802 is mounted under a wing 2806 of a high wing aircraft 2808.

Figure 29:
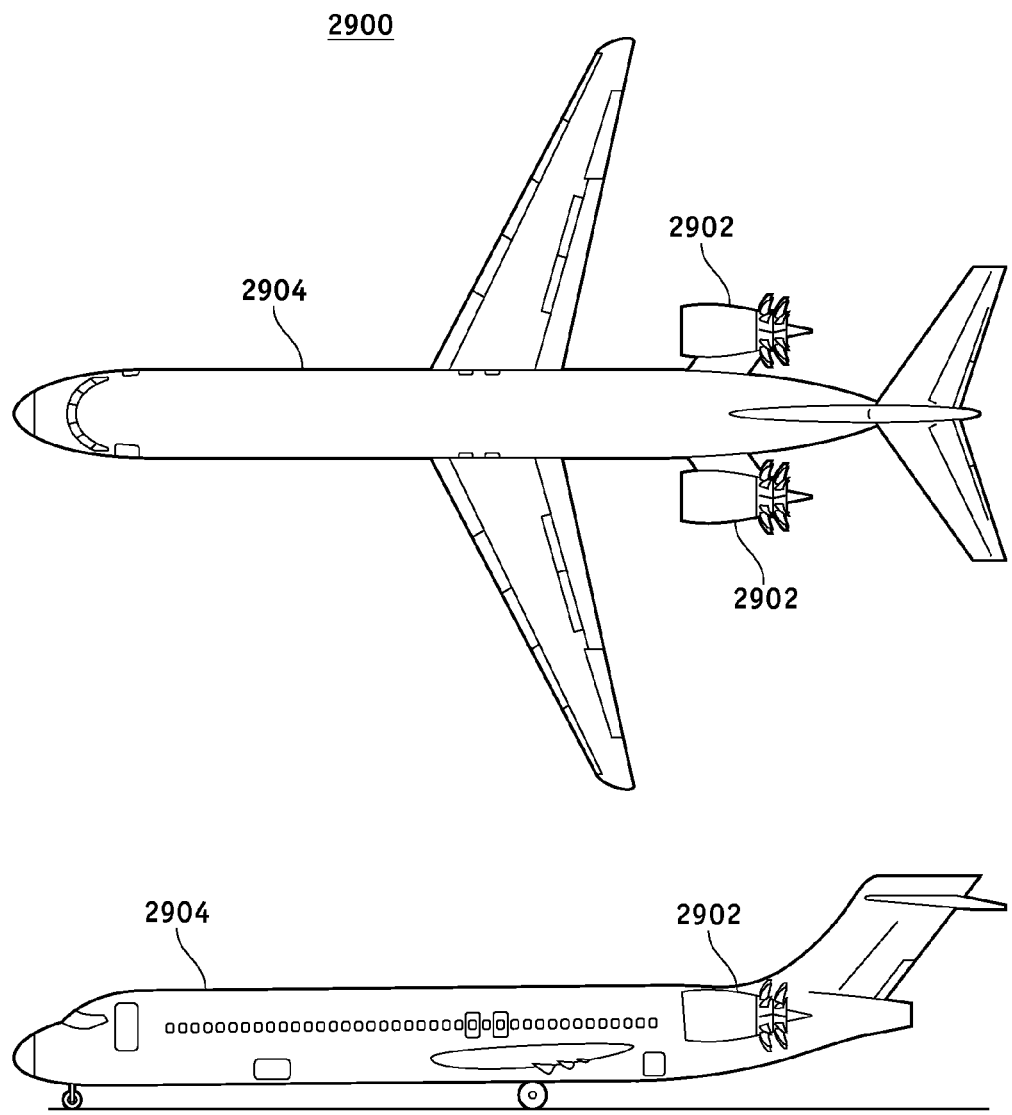
FIG. 29 is an illustration of top and side views of an exemplary tail mounting of a dual pusher configuration of an ultra-efficient aircraft propulsor with an augmentor fan according to an embodiment of the disclosure.

FIG. 29 is an illustration of top and side views of an exemplary tail mounting of a contra-rotating dual rotor pusher configuration of an ultra-efficient aircraft propulsor 2902 (propulsor 2902) with an augmentor fan according to an embodiment of the disclosure. As shown in FIG. 29, two exemplary propulsors 2902 are mounted on a tail section of a low wing aircraft 2904.

Figure 30:
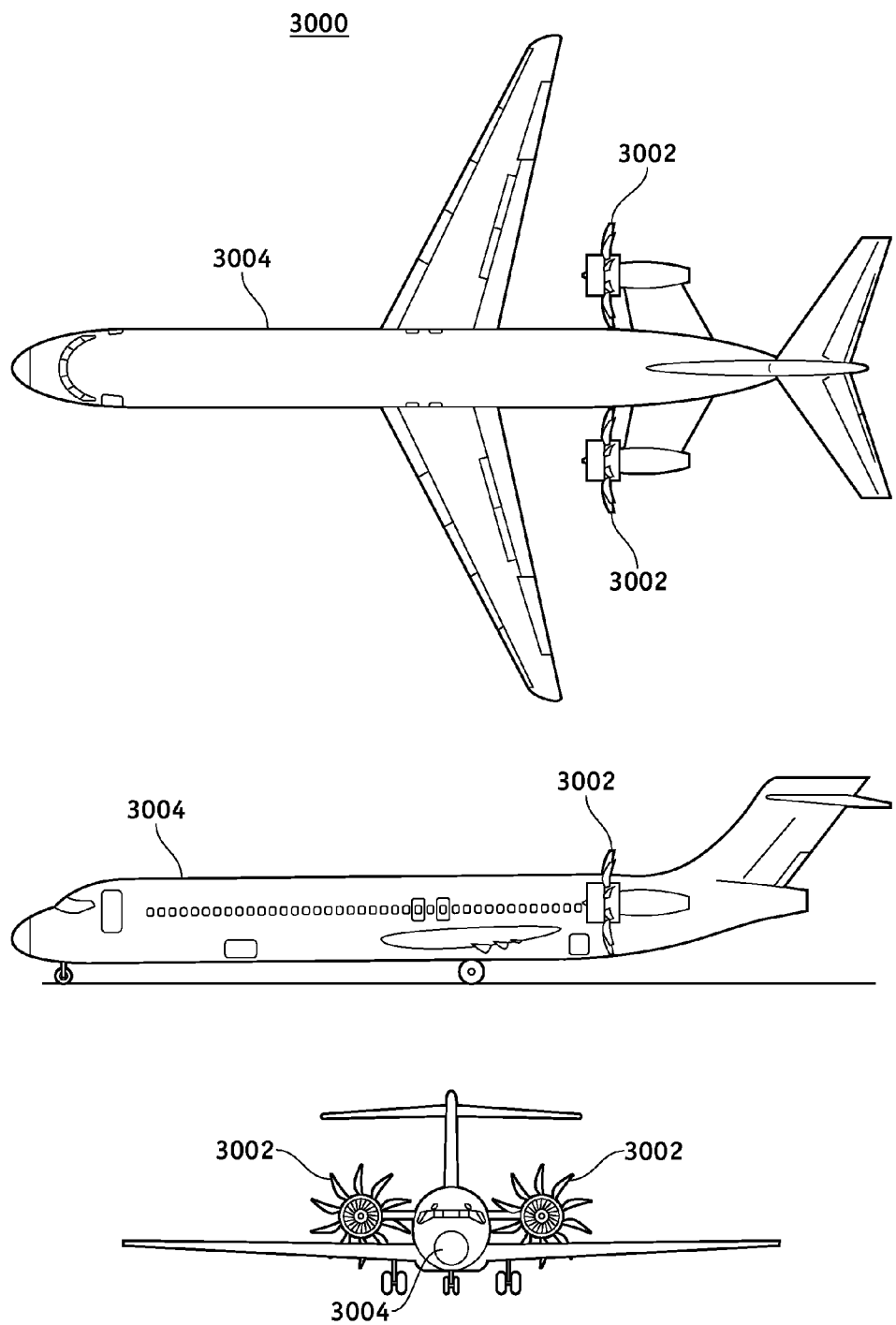
FIG. 30 is an illustration of top, side and front views of an exemplary tail mounting of a single rotor tractor configuration of an ultra-efficient aircraft propulsor with an augmentor fan according to an embodiment of the disclosure.

FIG. 30 is an illustration of top, side, and front views of an exemplary tail mounting of a single rotor tractor configuration of the ultra-efficient aircraft propulsor 3002 (propulsor 3002) with an augmentor fan according to an embodiment of the disclosure. As shown in FIG. 30, two propulsors 3002 are mounted on a tail section of a low wing aircraft 3004.

Figure 31:
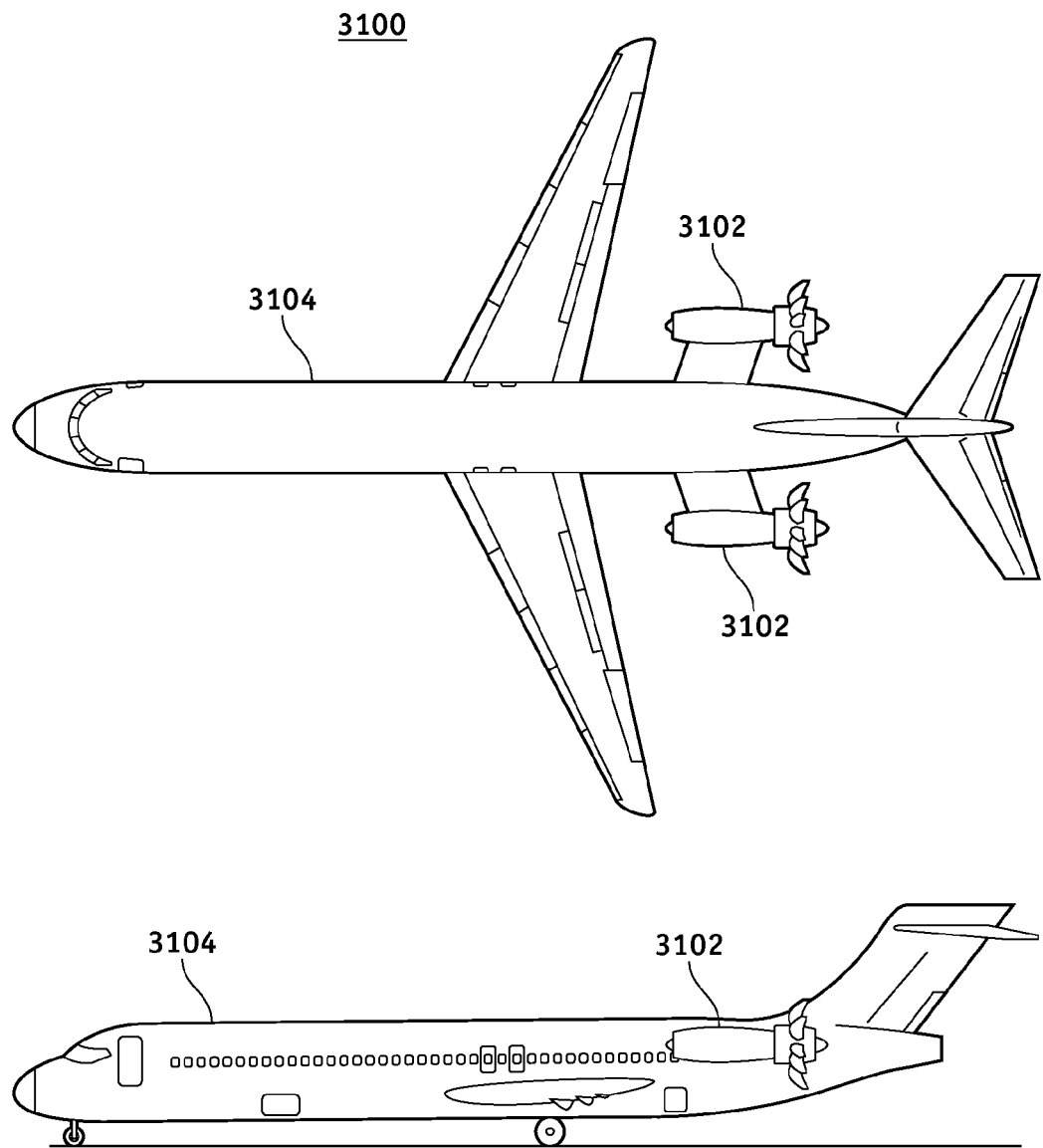
FIG. 31 is an illustration of top and side views of an exemplary tail mounting of a single rotor pusher configuration of an ultra-efficient aircraft propulsor with an augmentor fan according to an embodiment of the disclosure.

FIG. 31 is an illustration of top and side views of an exemplary tail mounting of a single rotor pusher configuration of an ultra-efficient aircraft propulsor 3102 (propulsor 3102) with an augmentor fan according to an embodiment of the disclosure. As shown in FIG. 31, two propulsors 3102 are mounted on a tail section of a low wing aircraft 3104.

Figure 32:
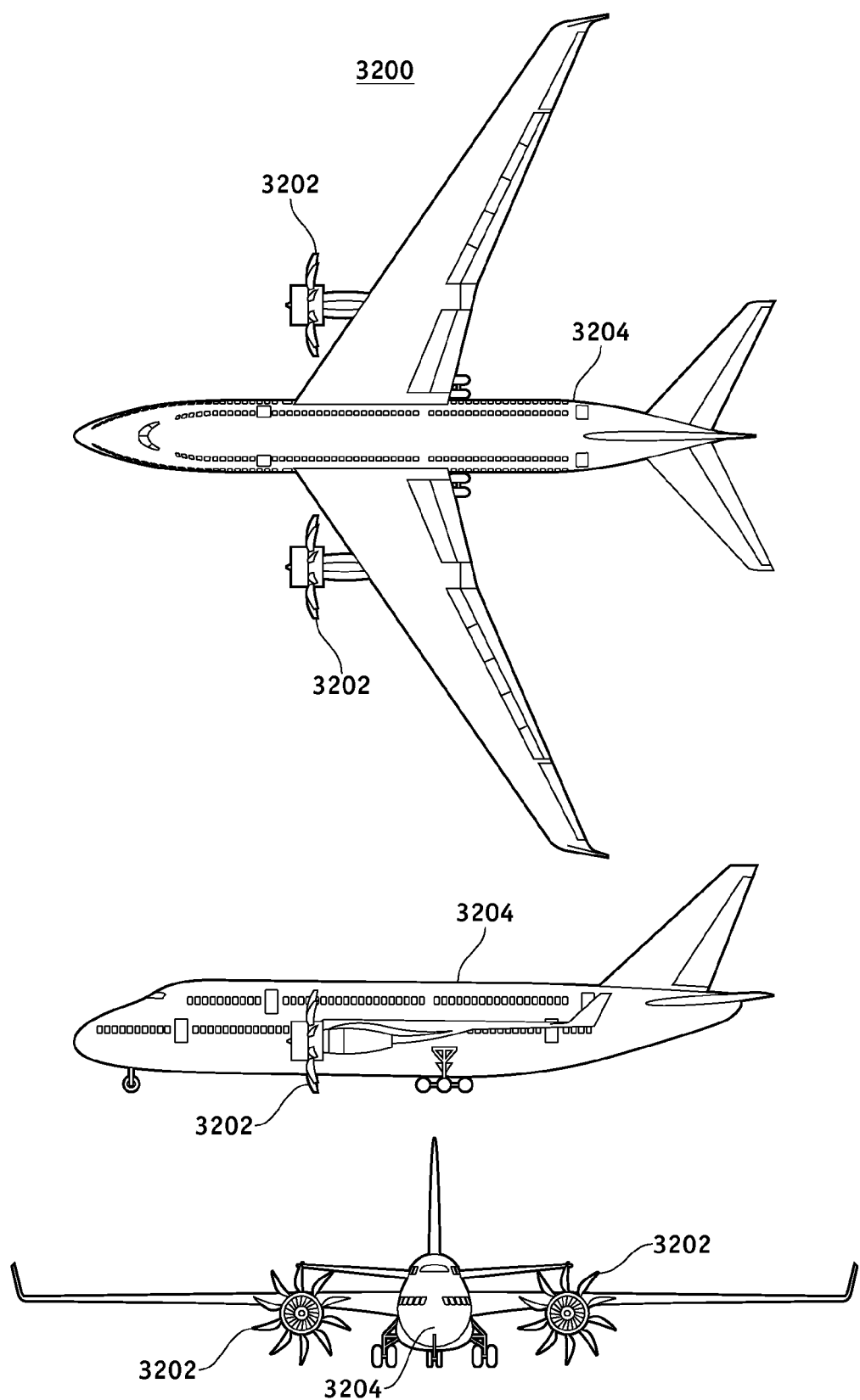
FIG. 32 is an illustration of top, side and front views of an exemplary under wing mounting on an exemplary large mid-wing aircraft of a single rotor tractor configuration of an ultra-efficient aircraft propulsor with an augmentor fan according to an embodiment of the disclosure.

FIG. 32 is an illustration of top, side, and front views of an exemplary under wing mounting on a large mid-wing aircraft 3204 of a single rotor tractor configuration of the ultra-efficient aircraft propulsor 3202 (propulsor 3202) with an augmentor fan according to an embodiment of the disclosure. As shown in FIG. 32, two exemplary ultra-efficient aircraft propulsors 3202 are mounted on respective wings of a mid-wing aircraft 3204.

Figure 33:
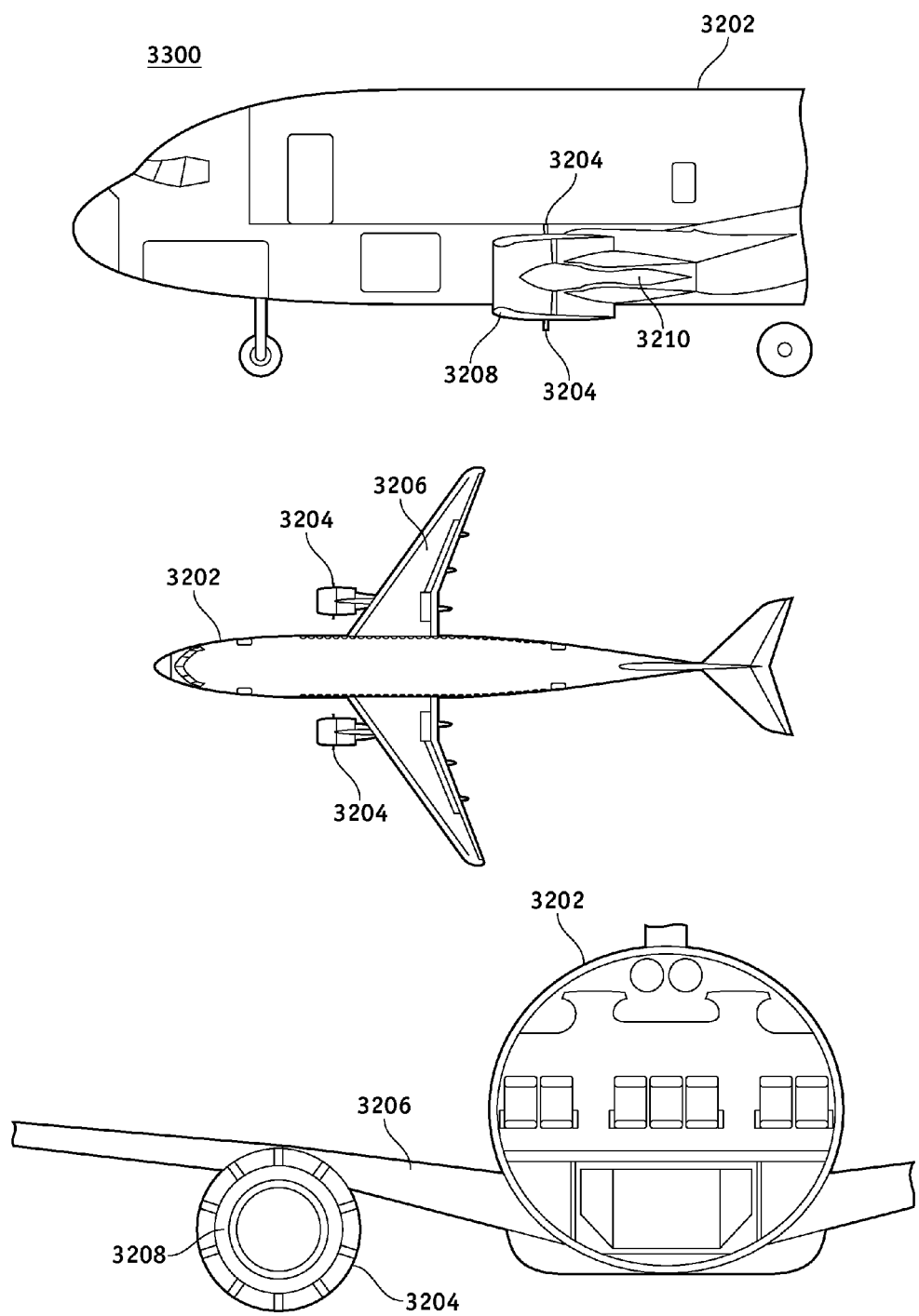
FIG. 33 is an illustration of side, top and front views of an exemplary low-wing mounting of a single rotor tractor configuration of an ultra-efficient aircraft propulsor showing an encircling spinning tip ring according to an embodiment of the disclosure.

FIG. 33 is an illustration of side, top and front views of an exemplary low-wing mounting of a single rotor tractor ultra-efficient aircraft propulsor 3304 (propulsor 3304) showing an encircling spinning tip ring 3304 (i.e., similar to augmentor fan tip ring 1502) according to an embodiment of the disclosure. The encircling spinning tip ring 3304 can provide the ultra-efficient aircraft propulsor 300 with further noise reduction. As shown in FIG. 33, two propulsors 3308 each comprising an encircling spinning tip ring 3304 are mounted on respective wings 3306 of a low-wing aircraft 3302.

FIGS. 34-38 are illustrations of various embodiments of ultra-efficient aircraft propulsors according the present disclosure. Embodiments shown in FIGS. 34-38 may have functions, material, and structures that are similar to the embodiments shown in FIGS. 3-33. Therefore common features, functions, and elements may not be redundantly described here.

Figure 34:
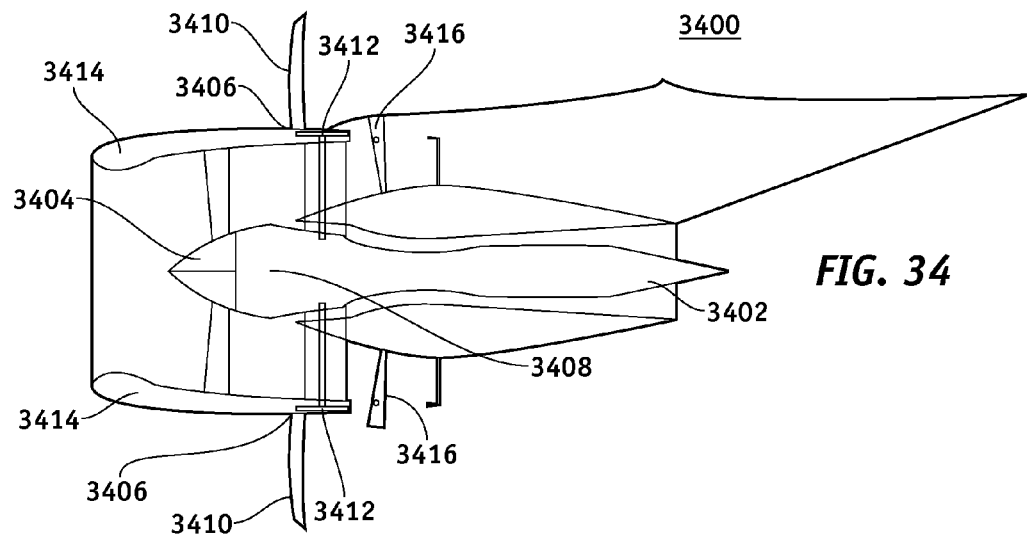
FIG. 34 is an illustration of a schematic cross sectional view of an exemplary thrust reverser configuration of an ultra-efficient aircraft propulsor with an augmentor fan according to an embodiment of the disclosure.

FIG. 34 is an illustration of a schematic cross sectional view of an exemplary thrust reverser configuration of an ultra-efficient aircraft propulsor 3400 with an augmentor fan 3406 according to an embodiment of the disclosure. The thrust reverser 3416 is configured to produce reverse thrust by reversing the ducted fan mass flow steam 804 (FIG. 8) from the ducted fan 3404. As shown in the embodiment of FIG. 34, a standard type of thrust reverser can be fitted to a ducted fan 3404 of an ultra-efficient aircraft propulsor such as ultra-efficient aircraft propulsor 3400. Alternatively, a thrust reverser can be fitted to a core engine 3402 to reverse the core mass flow stream 802 (FIG. 8). In some embodiments, a thrust reverse can be fitted to an augmentor fan blade 3410 with or without a tip ring (encircling spinning tip ring 3304 in FIG. 33). The thrust reverser 3416 may be any of the thrust reverser types 3912 explained below in the context of discussion of FIG. 39. As explained below, the thrust reverser 3416 may also comprise means for changing the pitch orientation of the augmentor fan blades 3410. In one embodiment, a flow vectoring device such as the flow vectoring device 3926 (FIG. 39) may be used for vectoring the flow downstream of at least one of the core engine 3402, the ducted fan 3404, and/or the augmentor fan 3406. A drive system 3408 comprises a gear architecture of the drive system 2612 of FIG. 26 mounted on an aft end of fan cowl 3414. A gear sprocket 3412 drives the augmentor fan blades 3410.

Figure 35:
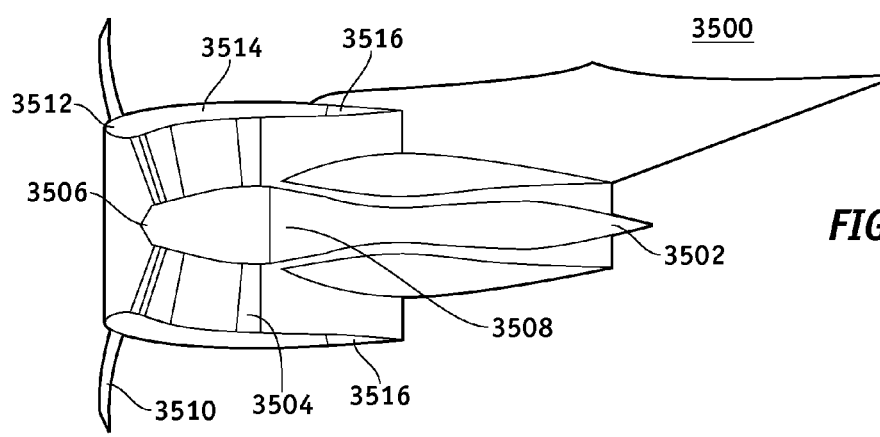
FIG. 35 is an illustration of a schematic cross sectional view of an exemplary ultra-efficient aircraft propulsor with a front mounted augmentor fan and thrust reverser configuration according to an embodiment of the disclosure.

FIG. 35 is an illustration of a schematic cross sectional view of an exemplary ultra-efficient aircraft propulsor 3500 (propulsor 3500) with a front mounted augmentor fan and thrust reverser configuration according to an embodiment of the disclosure. The propulsor 3500 comprises a core engine 3502, a ducted fan 3504, an augmentor fan 3506, and a thrust reverser 3516. The augmentor fan 3506 utilizes the gear architecture of the drive system 2612 of FIG. 26 (drive system 3508) mounted on a forward end of the fan cowl 3514. An augmentor hub ring 3512 rotates the augmentor fan blades 3510 on the forward end of the fan cowl 3514. The thrust reverser 3516 comprises similar functionality as the thrust reversers 3416 (FIG. 34), but is shown in a non-deployed position.

Figure 36:
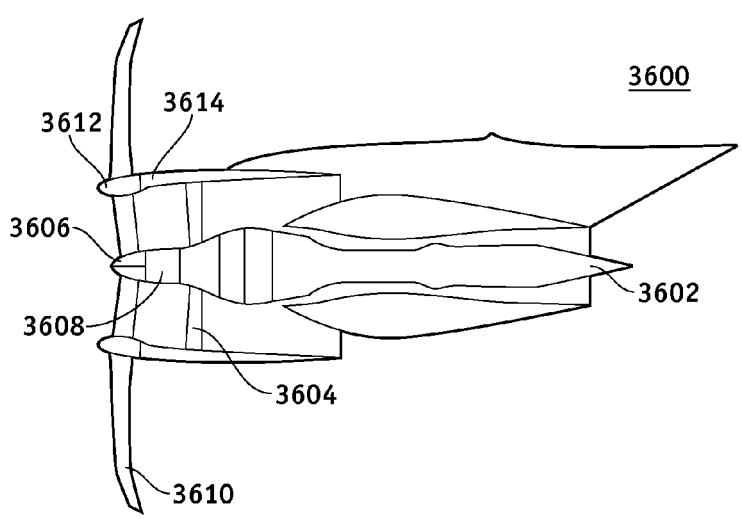
FIG. 36 is an illustration of a schematic cross sectional view of an exemplary ultra-efficient aircraft propulsor showing a front mounted augmentor fan according to an embodiment of the disclosure.

FIG. 36 is an illustration of a schematic cross sectional view of an exemplary ultra-efficient aircraft propulsor 3600 (propulsor 3600) with a front mounted augmentor fan according to an embodiment of the disclosure. The propulsor 3600 comprises a core engine 3602, a ducted fan 3604, and an augmentor fan 3606. The augmentor fan 3606 utilizes a drive system 3608 mounted on a forward end of the fan cowl 3614. An augmentor hub ring 3612 rotates the augmentor fan blades 3610 on the forward end of the fan cowl 3614.

Figure 37:
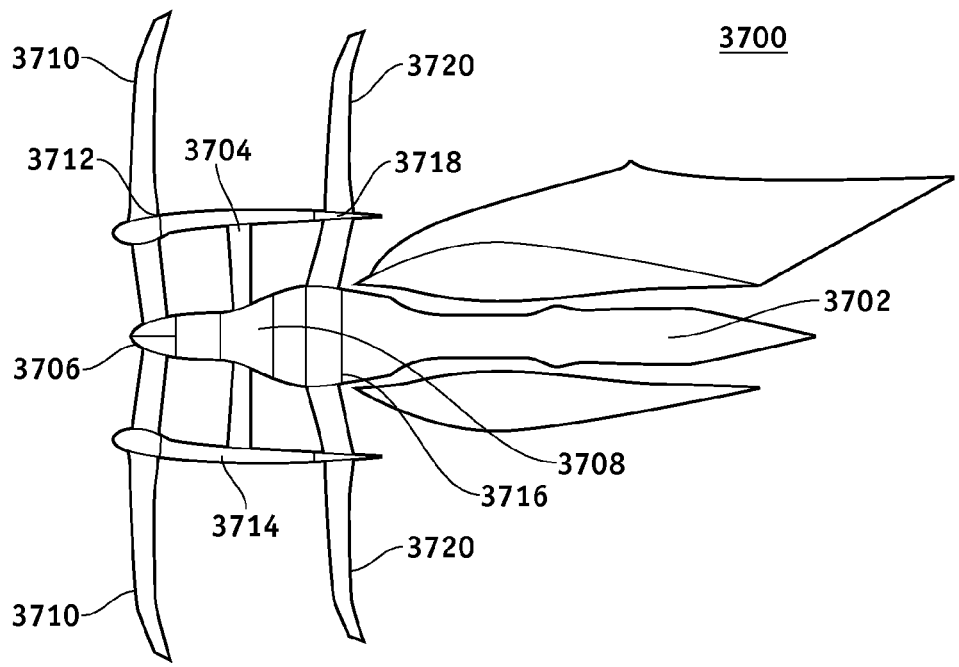
FIG. 37 is an illustration of a schematic cross sectional view of an exemplary dual puller configuration of an ultra-efficient aircraft propulsor with an augmentor fan according to an embodiment of the disclosure.

FIG. 37 is an illustration of a schematic cross sectional view of an exemplary dual puller configuration of an ultra-efficient aircraft propulsor 3700 (puller configuration 3700) with an augmentor fan according to an embodiment of the disclosure. The puller configuration 3700 comprises a core engine 3702, a ducted fan 3704, a first augmentor fan 3706, and a second augmentor fan 3716. The first augmentor fan 3706 is mounted on a forward end of the fan cowl 3714. An augmentor hub ring 3712 rotates first augmentor fan blades 3710 on the forward end of the fan cowl 3714. The second augmentor fan 3716 is mounted on an aft end of the fan cowl 3714. An augmentor hub ring 3718 rotates second augmentor fan blades 3720 on the aft end of the fan cowl 3714. A drive system 3708 provides power splitting between the core engine 3702, the ducted fan 3704, the first augmentor fan 3706, and the second augmentor fan 3716. In some embodiments, the first augmentor fan blades 3710 and the second augmentor fan blades 3720 are configured to rotate in the same direction. Alternately, the first augmentor fan blades 3710 and the second augmentor fan blades 3720 can be configured to contra-rotate with respect to one another. The puller configuration 3700 allows a doubling of the number of total augmentor fan blades, which can be used to reduce blade loading, hub-to-tip ratio, and wavedrag.

Figure 38:
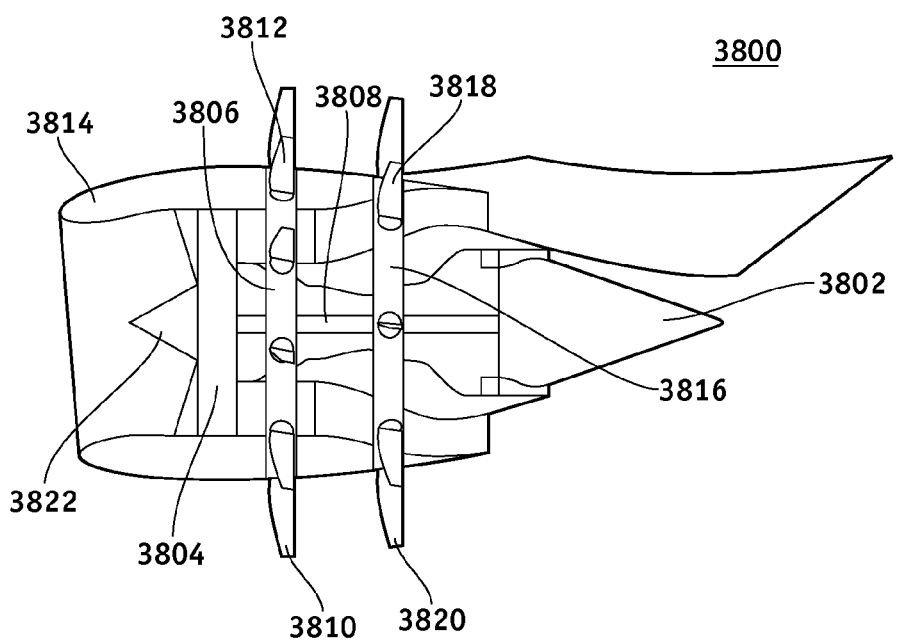
FIG. 38 is an illustration of a schematic cross sectional view of an exemplary dual puller configuration of an ultra-efficient aircraft propulsor with two augmentor fans according to an embodiment of the disclosure.

FIG. 38 is an illustration of a schematic cross sectional view of an exemplary dual puller configuration of an ultra-efficient aircraft propulsor 3800 (puller configuration 3800) with two augmentor fans according to an embodiment of the disclosure. The propulsor 3800 comprises a core engine 3802, a ducted fan 3804, a first augmentor fan 3806, and a second augmentor fan 3816, a first augmentor hub ring 3812, and a second augmentor hub ring 3818. The second augmentor hub ring 3818 substantially surrounds an inner perimeter of the fan cowl 3814 and is longitudinally spaced from the first augmentor hub ring 3812. The second augmentor hub ring 3818 may be operable to contra-rotate relative to the first augmentor hub ring 3812. The first augmentor hub ring 3812 and the second augmentor hub ring 3818 are driven by the core engine 3802. The first augmentor hub ring 3812 comprises a plurality of first augmentor fan blades 3810 arranged circumferentially around the first augmentor hub ring 3812. The second augmentor hub ring 3818 comprises a plurality of second augmentor fan blades 3820 arranged circumferentially around the second augmentor hub ring 3818. A number of the first augmentor fan blades 3810 and/or a number of the second augmentor fan blades 3820 can be chosen to avoid sum and difference tones.

A drive system 3808 provides power splitting between the core engine 3802, the ducted fan 3804, the first augmentor fan 3806, and the second augmentor fan 3816. In some embodiments, the first augmentor fan blades 3810 and the second augmentor fan blades 3820 are configured to rotate in the same direction. Alternately, the first augmentor fan blades 3810 and the second augmentor fan blades 3820 can be configured to contra-rotate with respect to one another. The drive system 3808 utilizes the gear architecture of the drive system 2612 of FIG. 26.

By using two or more augmentor fans, the ultra-efficient aircraft propulsor 3800 provides a large total number of blades and the noise and wave drag benefits thereof. For example but without limitation, if there are 17 first augmentor fan blades 3810 and 15 second augmentor fan blades 3820, that is approximately equivalent to a single augmentor fan with 32 blades. The BPF can be calculated as shown above in the context of FIG. 6 at 2400 rpm as 1280 Hz, with the improved noise characteristics thereof. The puller configuration 3800 allows a doubling of the number of total blades, which can be used to reduce blade loading, hub-to-tip ratio, and wavedrag.

Figure 39:
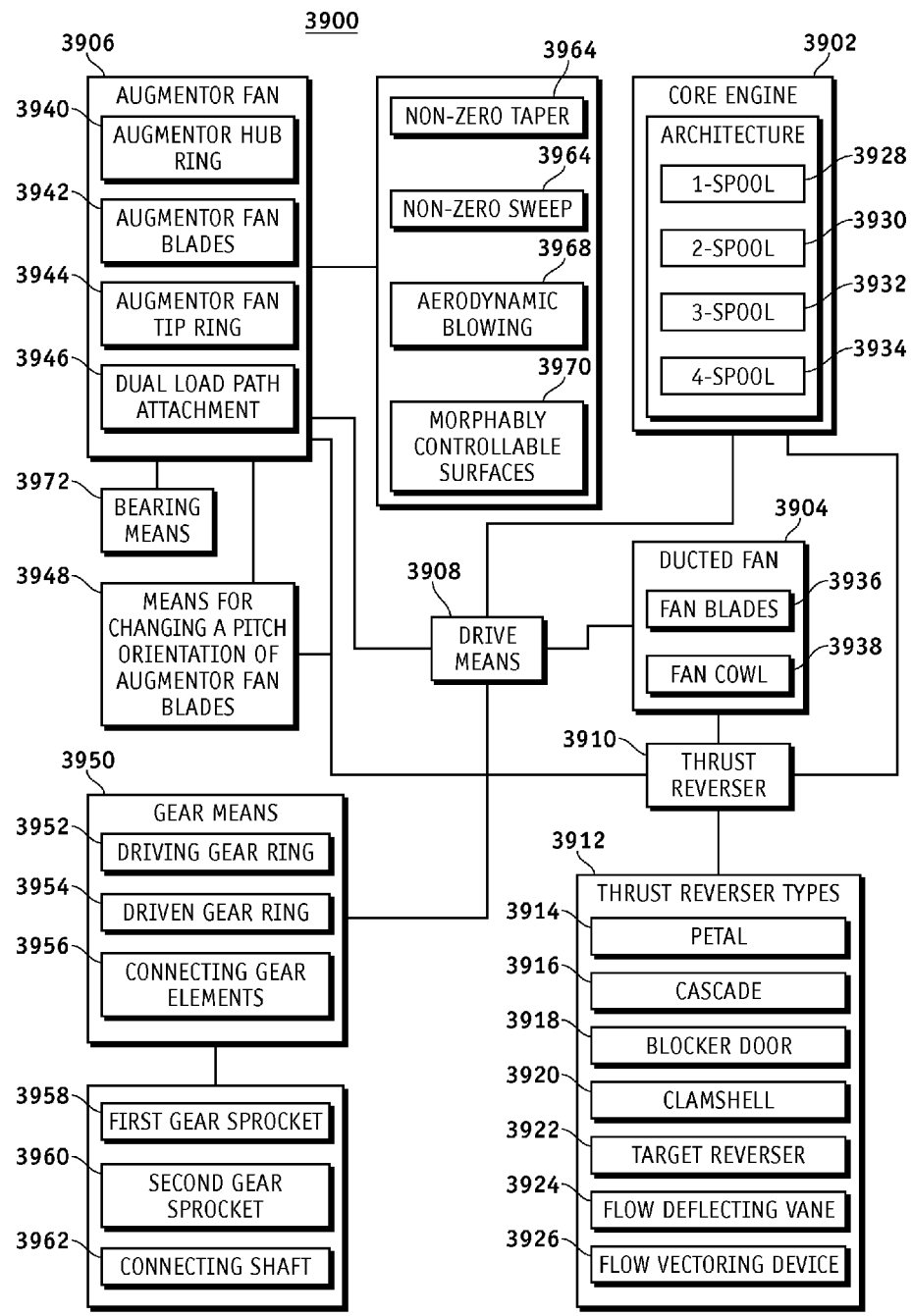
FIG. 39 is an illustration of an exemplary block diagram of an ultra-efficient aircraft propulsor engine according to various embodiments of the disclosure.

FIG. 39 is an illustration of an exemplary block diagram 3900 of an ultra-efficient aircraft propulsor engine according to various embodiments of the disclosure. The block diagram 3900 is a generalization of the embodiments shown in FIGS. 3-38. The block diagram 3900 may have functions, material, and structures that are similar to the embodiments shown in FIGS. 3-38. Therefore common features, functions, and elements may not be redundantly described here. The block diagram 3900 comprises: a core engine 3902, a ducted fan 3904, an augmentor fan 3906, drive means 3908, and thrust reverser means 3910.

The core engine 3902 is operable to drive the augmentor fan 3906. The core engine 3902 substantially utilizes at least one of the thermodynamic cycles mentioned above in the context of discussion of FIG. 3. The core engine 3902 architecture may be, for example but without limitation, at least one of a 1-spool 3928, 2-spool 3930, 3-spool 3932, 4-spool 3934, and the like.

The ducted fan 3904 is operable to be driven by the core engine 3902. The ducted fan 3904 comprises fan blades 3936 circumferentially contained by a fan cowl (duct) 3938 as explained in the context of discussion of FIG. 3 above.

The augmentor fan 3906 is operable to be driven by the core engine 3902. The augmentor fan 3906 comprises augmentor fan blades 3942 arranged circumferentially around the augmentor hub ring 3940. The augmentor hub ring 3940 substantially surrounds an inner perimeter of the fan cowl 3938. The augmentor fan blades 3942 may be attached to the augmentor hub ring 3940 by, for example but without limitation, at least a dual load path attachment 3946. The augmentor fan 3906 may also comprise means for changing a pitch orientation of the augmentor fan blades 3948. The augmentor fan blades 3942 may comprise non-zero taper 3964, non-zero sweep 3966, and/or morphably controllable surfaces 3970, and the like. The augmentor fan blades 3942 may also provide aerodynamic blowing 3968. The augmentor fan blades 3942 may also be circumscribed by an augmentor fan tip ring 3944.

The drive means 3908 may comprise gear means 3950 for transmitting power while changing revolutions per minute. The gear means 3950 comprises a driving gear ring 3952 around an inner perimeter of the fan cowl 3938, a driven gear ring 3954 around an inner periphery of the augmentor hub ring 3940, and connecting gear elements 3956 provided between a driving gear ring 3952 and the driven gear ring 3954.

The connecting gear elements 2614/3956 comprise a first gear sprocket 3958 engaged by the driving gear ring 2610/3952, a second gear sprocket 3960 engaging the driven gear ring 3954 on the augmentor hub ring 2606/3940, and a shaft (not shown) connecting hubs of the first gear sprocket 3958 and the second gear sprocket 3960. The circumference of the second gear sprocket 3960 is less than the circumference of the first gear sprocket 3958, to cause an effective gearing wherein the rotational RPM of the driven gear ring 3954 is reduced relative to the rotational RPM of the driving gear ring 2610/3952.

The thrust reverser means 3910 is operable to reverse at least one of the core mass flow stream 802 and the ducted fan mass flow stream 804, and the augmentor fan mass flow stream 806. The thrust reverse means 3910 may comprise a variety of thrust reverser types 3912, for example but without limitation, petal reverser elements 3914, cascade reverser elements 3916, blocker door reverser elements 3918, clamshell reverser elements 3920, target reverser elements 3922, flow deflecting vane reverser elements 3924, and the like. In one embodiment, a flow vectoring device 3926 may be used for vectoring the flow downstream of at least one of the core engine 3902, the ducted fan 3904, and/or the augmentor fan 3906. The thrust reverser means 3910 may also comprise, for example but without limitation, means for changing a pitch orientation of the augmentor fan blades 3934, and the like.

Although exemplary embodiments of the present disclosure have been described above with reference to the accompanying drawings, it is understood that the disclosure is not limited to the above-described embodiments. Various alterations and modifications to the above embodiments are contemplated to be within the scope of the disclosure. It should be understood that those alterations and modifications are included in the technical scope of the disclosure as defined by the appended claims.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A method of generating thrust with an aircraft propulsor having an augmentor fan, a core engine, and a ducted fan, the method comprising
    providing thrust from the core engine at a first thrust to total power ratio;
    providing thrust from the ducted fan at a second thrust to total power ratio; and
    providing thrust from the augmentor fan at a third thrust to total power ratio,
    wherein the third thrust to total power ratio is greater than the second thrust to total power ratio for a first set of flight conditions,
    wherein the first set of flight conditions comprises takeoff,
    wherein the second thrust to total power ratio is greater than the third thrust to total power ratio for a second set of flight conditions, and
    wherein the second set of flight conditions comprises climb out at a speed of about Mach 0.35.

2. The method of claim 1, further comprising powering the ducted fan and the augmentor fan by the core engine.

3. The method of claim 1, further comprising varying the first thrust to total power ratio, the second thrust to total power ratio, and the third thrust to total power.

4. The method of claim 1, further comprising flow vectoring a flow downstream of the core engine, the ducted fan, or the augmentor fan.

5. A method of generating thrust with an aircraft propulsor having an unducted augmentor fan, a core engine, and a ducted fan, the method comprising
    providing thrust from the core engine at a first thrust to total power ratio;
    providing thrust from the ducted fan at a second thrust to total power ratio; and
    providing thrust from the unducted augmentor fan, which circumscribes the ducted fan, at a third thrust to total power ratio.

6. The method of claim 5, wherein the ducted fan comprises a plurality of ducted fan blades circumferentially contained by a fan cowl,
    wherein the augmentor fan comprises a plurality of augmentor fan blades arranged circumferentially around an augmentor hub,
    wherein the augmentor hub substantially surrounds an inner perimeter of the fan cowl and is configured to rotate separately from the ducted fan.

7. The method of claim 6, further comprising driving the ducted fan and the augmentor fan using power from the core engine,
    wherein the core engine and the ducted fan comprise a turbofan propulsor,
    wherein the core engine comprises a combustion engine, and
    wherein the augmentor fan is mechanically coupled to and driven by the core engine.

8. The method of claim 5, wherein:
    the third thrust to total power ratio is greater than the second thrust to total power ratio for a first set of flight conditions; and
    the second thrust to total power ratio is greater than the third thrust to total power ratio for a second set of flight conditions.

9. The method of claim 8, wherein:
    the first set of flight conditions comprises takeoff; and
    the second set of flight conditions comprises climb out.

10. The method of claim 5, further comprising varying the first thrust to total power ratio, the second thrust to total power ratio, and the third thrust to total power.

11. The method of claim 5, further comprising flow vectoring a flow downstream of the core engine, the ducted fan, or the augmentor fan.

12. The method of claim 5, further comprising:
    providing a first mass flow stream from the augmentor fan;
    providing a second mass flow stream from the ducted fan; and
    providing a third mass flow stream from the core engine,
    wherein the first mass flow stream circumscribes the second mass flow stream and the second mass flow stream circumscribes the third mass flow stream.

13. The method of claim 6, further comprising varying, based on an optimization parameter, a pitch angle of the plurality of augmentor fan blades to provide angles of attack along a span of the plurality of augmentor fan blades.

14. The method of claim 13, further comprising determining the optimization parameter by measuring at least one parameter selected from a group consisting of: an aerodynamic efficiency, a fuel efficiency, a takeoff performance, a climb performance, a cruise performance, a performance in descending flight, and a reverse thrust performance.

15. The method of claim 13, further comprising determining the optimization parameter by measuring at least one parameter selected from a group consisting of: a community noise and a cabin noise.

16. The method of claim 13, further comprising determining the optimization parameter by measuring a power division between the augmentor fan, the ducted fan, and the core engine.

17. The method of claim 5, wherein a tip of each of the plurality of augmentor fan blades is coupled to an augmentor fan tip ring encircling all of the plurality of augmentor fan blades, and wherein the method further comprises rotating the augmentor fan tip ring with the augmentor fan.

18. A method of generating thrust with an aircraft propulsor having an augmentor fan, a core engine, and a ducted fan, the method comprising providing thrust from the core engine at a first thrust to total power ratio;

providing thrust from the ducted fan at a second thrust to total power ratio;

providing thrust from the augmentor fan at a third thrust to total power ratio, wherein the augmentor fan comprises a plurality of unducted propeller blades aft of the ducted fan;

providing a first mass flow stream from the augmentor fan;

providing a second mass flow stream from the ducted fan; and providing a third mass flow stream from the core engine, wherein the second mass flow stream is circumscribed by the first mass flow stream and the third mass flow stream is circumscribed by the second mass flow stream.

19. The method of claim 18, wherein the ducted fan comprises a plurality of ducted fan blades circumferentially contained by a fan cowl, wherein the augmentor fan comprises a plurality of augmentor fan blades arranged circumferentially around an augmentor hub, and wherein the augmentor hub substantially surrounds an inner perimeter of the fan cowl and is configured to rotate separately from the ducted fan.

* * * * *